United States Patent
Aota et al.

(10) Patent No.: US 7,033,072 B2
(45) Date of Patent: Apr. 25, 2006

(54) TEMPERATURE SENSOR

(75) Inventors: Hideyuki Aota, Hyogo (JP); Hirofumi Watanabe, Hyogo (JP)

(73) Assignee: Ricoh Company, Ltd., (JP)

( * ) Notice: Subject to any disclaimer, the term of this patent is extended or adjusted under 35 U.S.C. 154(b) by 0 days.

(21) Appl. No.: 11/148,285

(22) Filed: Jun. 9, 2005

(65) Prior Publication Data

US 2005/0270011 A1    Dec. 8, 2005

Related U.S. Application Data

(62) Division of application No. 10/392,901, filed on Mar. 21, 2003, now Pat. No. 6,921,199.

(30) Foreign Application Priority Data

Mar. 22, 2002 (JP) ............................ 2002-081448
Feb. 5, 2003 (JP) ............................ 2003-028514

(51) Int. Cl.
*G01K 7/00* (2006.01)

(52) U.S. Cl. ...................... 374/178; 327/512
(58) Field of Classification Search ............... 374/178; 327/512, 513
See application file for complete search history.

(56) References Cited

U.S. PATENT DOCUMENTS

| | | | |
|---|---|---|---|
| 4,061,959 A | 12/1977 | Ahmed | |
| 4,325,018 A | 4/1982 | Schade, Jr. | |
| 4,448,549 A | 5/1984 | Hashimoto et al. | |
| 5,039,878 A | 8/1991 | Armstrong et al. | |
| 5,285,069 A | 2/1994 | Kaibara et al. | |
| 5,291,453 A | 3/1994 | Aota et al. | |
| 5,495,444 A | 2/1996 | Okubo et al. | |
| 5,656,841 A | 8/1997 | Watanabe et al. | |
| 5,825,673 A | 10/1998 | Watanabe | |
| 5,896,515 A | 4/1999 | Aota et al. | |
| 5,961,215 A | 10/1999 | Lee et al. | |
| 6,075,404 A | 6/2000 | Shindoh et al. | |
| 6,183,131 B1 | 2/2001 | Holloway et al. | |
| 6,266,762 B1 | 7/2001 | Aota et al. | |
| 6,271,730 B1 | 8/2001 | Abe et al. | |
| 6,316,915 B1 | 11/2001 | Fujiwara et al. | |
| 6,346,848 B1 | 2/2002 | Shkap | |
| 6,437,550 B1 | 8/2002 | Andoh et al. | |
| 6,489,831 B1 | 12/2002 | Matranga et al. | |
| 6,600,305 B1 | 7/2003 | Andoh et al. | |
| 6,664,843 B1 | 12/2003 | Dasgupta et al. | |
| 6,695,475 B1 * | 2/2004 | Yin | 374/171 |
| 6,717,457 B1 * | 4/2004 | Nanba et al. | 327/513 |
| 6,882,213 B1 * | 4/2005 | Kim | 327/512 |
| 2003/0006822 A1 * | 1/2003 | Murakami et al. | 327/513 |

FOREIGN PATENT DOCUMENTS

JP    9-243466    9/1997

* cited by examiner

*Primary Examiner*—Diego Gutierrez
*Assistant Examiner*—Mirellys Jagan
(74) *Attorney, Agent, or Firm*—Dickstein Shapiro Morin & Oshinsky LLP

(57) ABSTRACT

A temperature sensor comprises (a) a first voltage generating circuit that generates and outputs a first voltage having a positive or negative temperature coefficient in proportion to the absolute temperature; (b) a second voltage generating circuit that generates a second voltage having an opposite sign of temperature coefficient compared to the first voltage and outputs a reference voltage that does not have a temperature coefficient based on the second voltage; and (c) a comparator that compares the first voltage output from the first voltage generating circuit with the reference voltage output from the second voltage generating circuit.

12 Claims, 25 Drawing Sheets

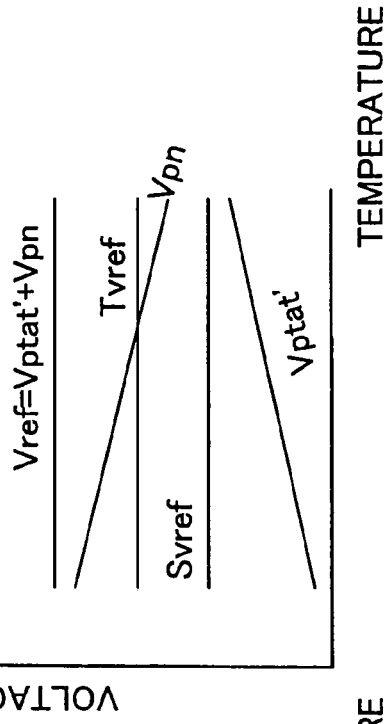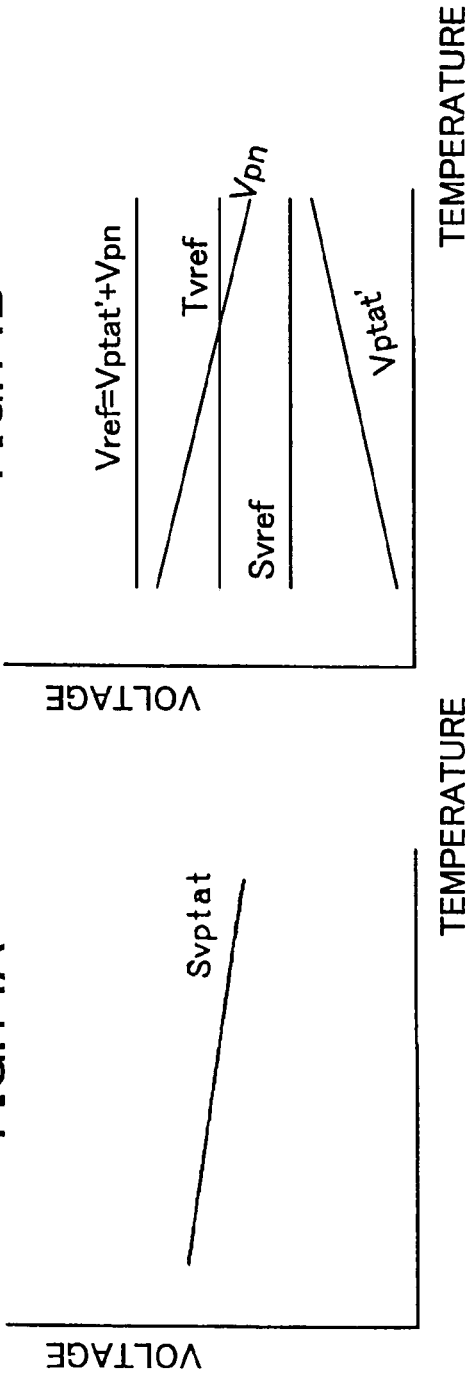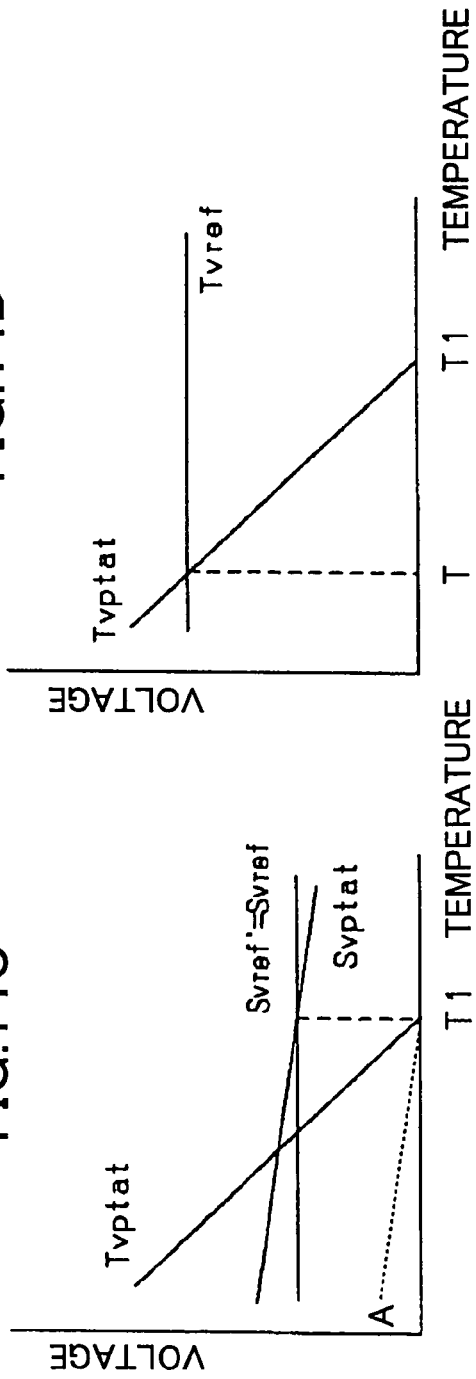

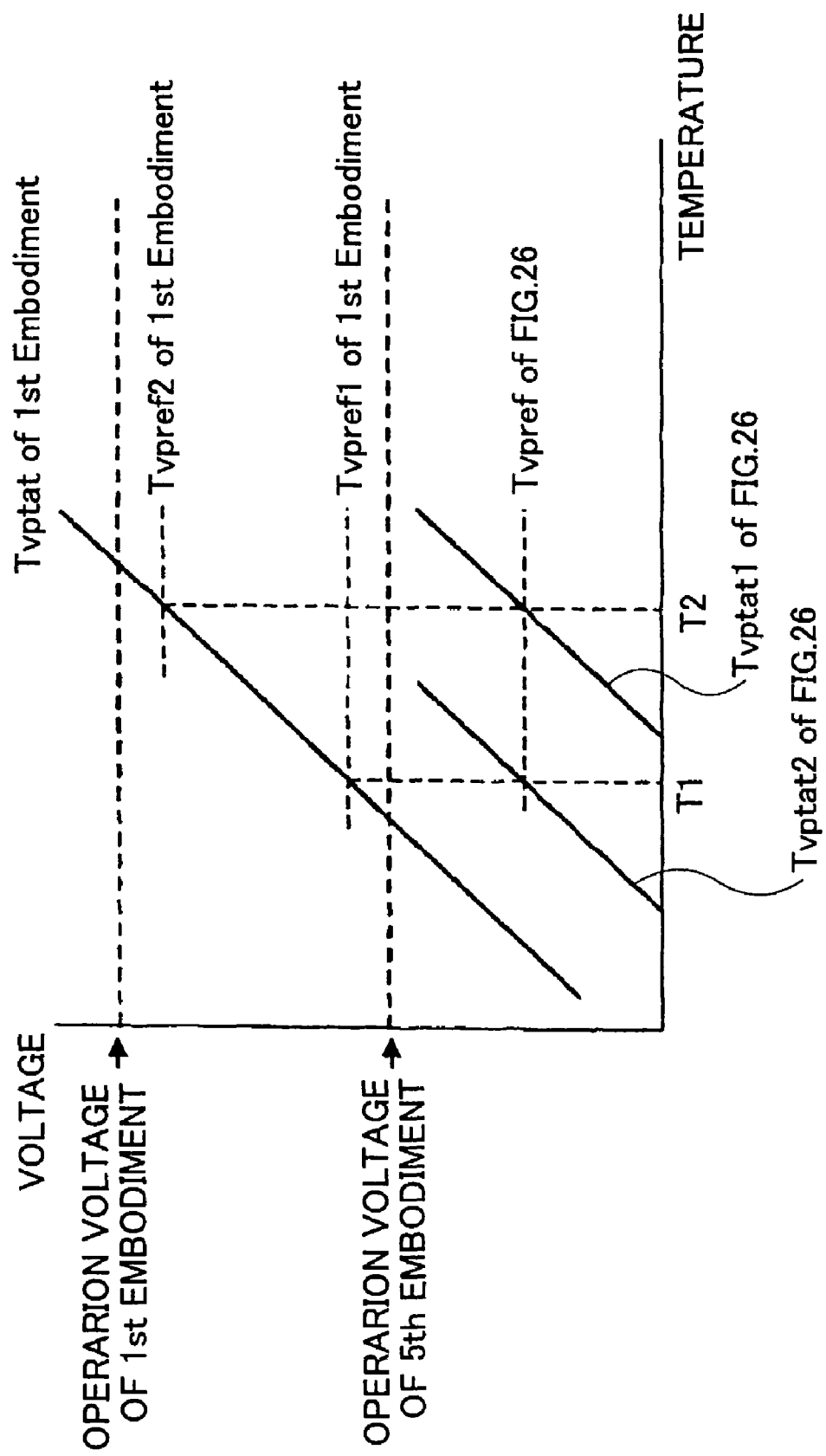

TEMPERATURE SENSOR

This application is a divisional of application Ser. No. 10/392,901, filed on Mar. 21, 2003 now U.S. Pat. No. 6,921,199, which is hereby incorporated by reference in its entirety.

BACKGROUND OF THE INVENTION

1. Field of the Invention

The present invention generally relates to a temperature sensor, and more particularly, to a temperature sensor for detecting the operating temperature of, for example, an LIS or other semiconductor devices, which is capable of stable operation in a high temperature range, while realizing at least one of a highly sensitive operating mode and a low-voltage operating mode.

2. Description of the Related Art

If an abnormally large quantity of electric current flows through a semiconductor integrated circuit, or if the temperature of the semiconductor integrated circuit rises too high due to the environmental change, the semiconductor integrated circuit will be destroyed. To prevent the destruction, the operation of the semiconductor integrated circuit has to be stopped before the detected temperature reaches the critical temperature. To this end, a temperature sensor or a temperature protection circuit is generally incorporated in the semiconductor integrated circuit to prevent the circuit from being damaged. Such a temperature sensor includes a PTAT voltage generator that generates a voltage proportional to the absolute temperature (which is referred to as a "PTAT voltage"), and a reference voltage generator for generating a reference voltage. The outputs from the PTAT voltage generator and the reference voltage generator are compared at a comparator, which is also included in the temperature sensor.

When the PTAT voltage exceeds the reference voltage (which is the target temperature at which the operation of the semiconductor integrated circuit has to be stopped), a chip enable (CE) signal for stopping the semiconductor integrated circuit is activated.

Both the PTAT voltage and the reference voltage have to be very precise, because if the precision of these voltages is degraded, the CE signal may be activated in spite of the fact that the semiconductor integrated circuit operates at an acceptable operating temperature, or the CE signal may not be activated even if the temperature exceeds the acceptable operative temperature. In the latter case, the semiconductor integrated circuit will be destroyed. Therefore, it is important for the temperature protection circuit to output the PTAT voltage and the reference voltage at high precision.

FIG. 1 illustrates a semiconductor temperature sensor disclosed in JPA H9-243466, which includes two MOS transistors N1 and N2 having different W/L ratios of the channel width W to the channel length L. If the same electric current Id is supplied from the constant voltage source 11, the gate-source voltages Vgs1 and Vgs2 generated at transistors N1 and N2 differ from each other. The potential difference between the two gate-source voltages (Vgs1−Vgs2) is in proportion to the operating temperatures of the transistors N1 and N2, and therefore, this voltage difference can be used as a PTAP signal. By adjusting the W/L ratios of the two MOS transistors N1 and N2, a signal having a positive or negative temperature coefficient can be obtained.

FIG. 2 illustrates another example of the temperature sensor, in which an NPN transistor or a PNP transistor is inserted by diode-connection. When a constant current is supplied, voltage Vt having a negative temperature coefficient appears between both ends of the diode. If the Vt exceeds the reference voltage Vref, a prescribed signal Tout is output from the comparator.

However, there is a problem in the semiconductor temperature sensor shown in FIG. 1 that outputs the potential difference between the gate-source voltages Vgs of two MOS transistors. The problem is that the temperature range for accurately extracting the PTAP voltage is limited to the range from −50° C. to 100° C. The accuracy of the PTAP voltage cannot be guaranteed at a higher temperature above 100° C., at which the semiconductor integrated circuit is very likely to be destroyed.

The circuit shown in FIG. 2 using a diode connection is also disadvantageous because the PTAP voltage is adversely affected by process variation, and is incapable of outputting a precise PTAT voltage. In addition, the slope of the PTAT voltage in proportion to the absolute temperature (i.e., the temperature slope) cannot be adjusted freely because the temperature slope is fixed by the process. The structure shown in FIG. 2 is lacking in flexibility for designing different types of circuits, such as a highly precise temperature sensing circuit with a large temperature slope, or a low-voltage operating circuit with a small temperature slope.

Another problem in the prior art techniques is difficulty in producing a constant and stable reference voltage, with which the detected PTAT voltage is compared, independently of the temperature.

SUMMARY OF THE INVENTION

Therefore, it is an object of the present invention to provide a temperature sensor that is accurate even at a high operating temperature and has a flexibly selected temperature slope to improve the sensitivity or to allow a low-voltage operation.

By making the temperature slope adjustable, the temperature sensor can be designed for a desired operation mode, such as a highly sensitive operating mode, or a low-voltage operating mode.

It is another object of the invention to provide a highly sensitive and low-voltage operating temperature sensor. This is achieved by inserting a subtraction circuit in the temperature sensor. In this case, the output PTAT voltage can be reduced, while maintaining high sensitivity.

To achieve the object, the present invention makes use of the principle of difference in gate work function, the details of which are disclosed in U.S. Pat. No. 6,437,550.

In one aspect of the invention, a temperature sensor comprises (a) a first voltage generating circuit that generates and outputs a first voltage having a positive or negative temperature coefficient in proportion to the absolute temperature; (b) a second voltage generating circuit that generates a second voltage (Vpn) having an opposite sign of temperature coefficient to the first voltage, and outputs a reference voltage that does not have a temperature coefficient based on the second voltage; and (c) a comparator that compares the first voltage output from the first voltage generating circuit with the reference voltage output from the second voltage generating circuit.

The first voltage generating circuit includes a first transistor having a highly-doped n-type gate, a second transistor having a lightly-doped n-type gate, and a source follower that gives a gate potential to the second transistor.

The source follower is comprised of a third transistor and two or more resistors whose resistance values are adjustable, and the first voltage is output from the source follower to the comparison circuit.

With this structure, the temperature sensor makes use of the difference in gate work function to produce a PTAT voltage, and therefore, it is capable of stable operation even at a high temperature.

In addition, the temperature coefficient (or slope) of the PTAT voltage (that is, the first voltage) can be easily adjusted by simply adjusting the resistance values of the source follower.

The second voltage generating circuit includes a first transistor having a highly-doped n-type gate, a second transistor having a highly-doped p-type gate, and a source follower giving a gate potential to the second transistor.

The source follower is comprised of a third transistor and two or more resistors whose resistance values are adjustable, and the reference voltage is output from the source follower to the comparison circuit.

With this structure, the second voltage is generated making use of the difference in gate work function, and a stable reference voltage can be output.

In another aspect of the invention, a temperature sensor comprises (a) a first voltage generating circuit that generates a first voltage having a positive or negative temperature coefficient; (b) a second voltage generating circuit that generates a first reference voltage and a second reference voltage that do not have a temperature coefficient; (c) a subtraction circuit that subtracts the first reference voltage supplied from the second voltage generating circuit from the first voltage supplied from the first voltage generating circuit and outputs a subtraction result; and (d) a comparison circuit that compares the subtraction result output from the subtraction circuit with the second reference voltage supplied form the second voltage generating circuit, and outputs a comparison result.

With this structure, the voltage level is reduced at the subtraction circuit even if the temperature coefficient (or slope) is increased for higher sensitivity. Accordingly, high-sensitivity operations and low-voltage operations are simultaneously realized.

BRIEF DESCRIPTION OF THE DRAWINGS

Other objects, features, and advantages of the present invention will become more apparent from the following detailed description when read in conjunction with the accompanying drawings, in which:

FIG. 14A through FIG. 14D are graphs showing the temperature characteristics of various signals generated in the circuit shown in FIG. 13;

FIG. 29 is a graph showing the operation characteristics of the temperature sensor of the fifth embodiment, in comparison with that of the first embodiment.

DETAILED DESCRIPTION OF THE EMBODIMENTS

The details of the present invention will now be described with reference to the attached drawings.

<First Embodiment>

Figure 1:
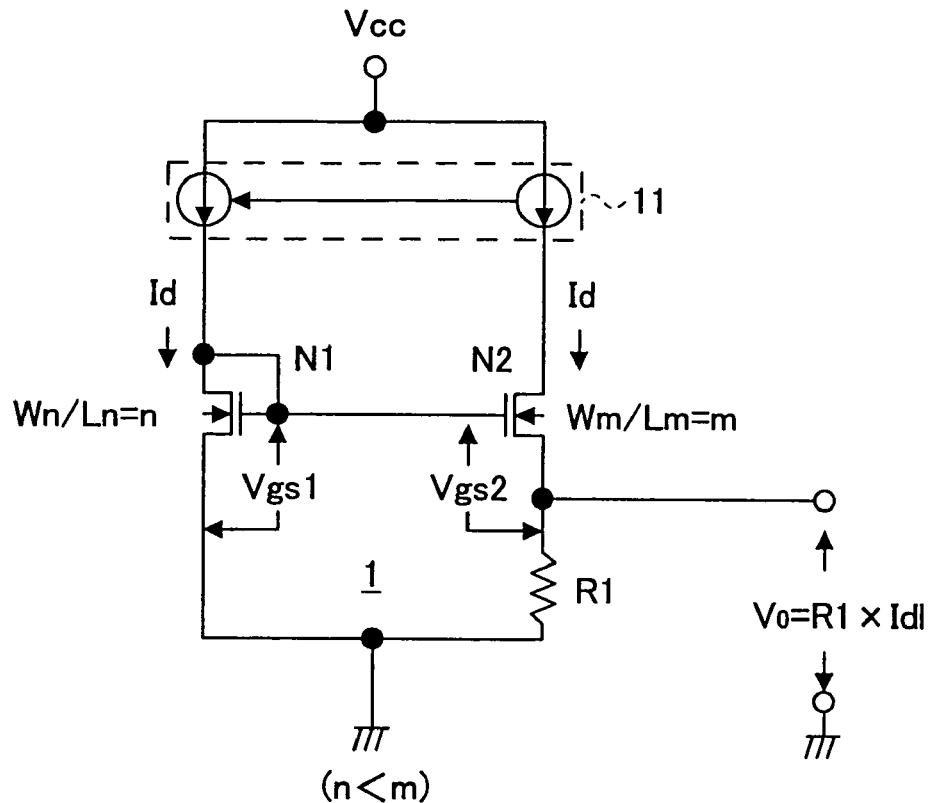
FIG. 1 illustrates a prior art circuit for generating a PTAP voltage.
Figure 2:
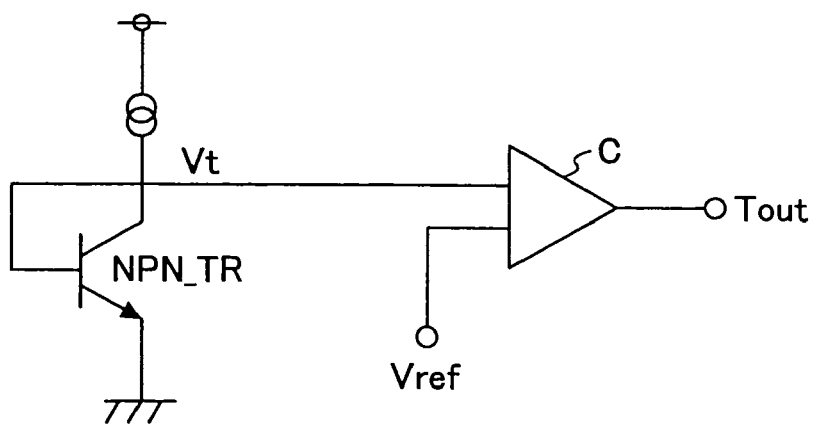
FIG. 2 illustrates a prior art circuit for obtaining a temperature detection signal.
Figure 3:
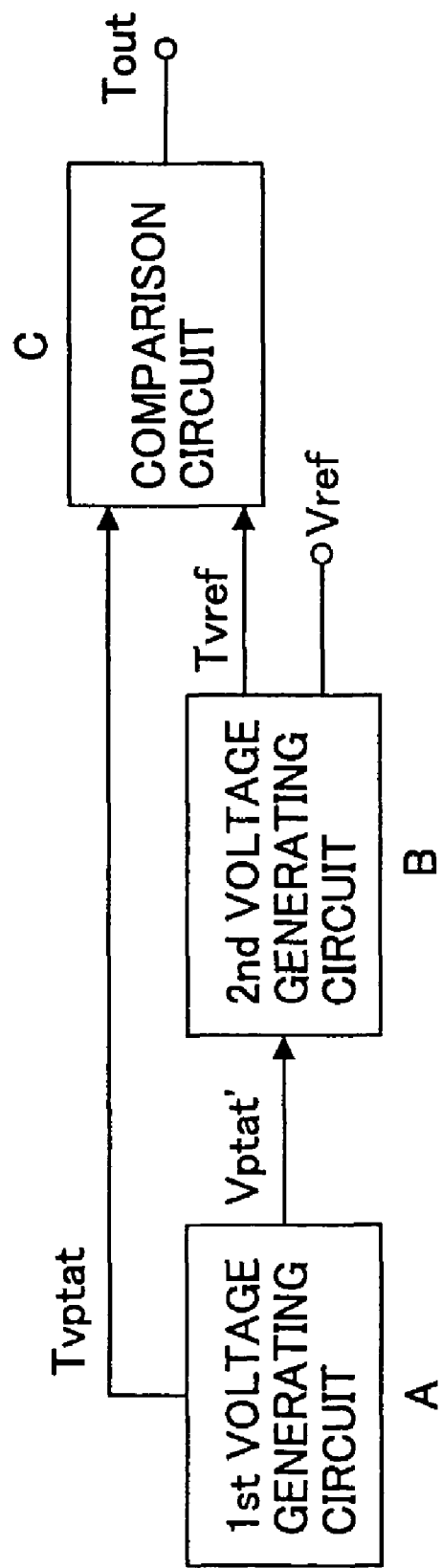
FIG. 3 is a block diagram of the temperature sensor according to the first embodiment of the invention.

FIG. 3 is a block diagram of the temperature sensor according to the first embodiment of the invention. The temperature sensor comprises a first voltage generating circuit A, a second voltage generating circuit B, and a comparison circuit C. The first voltage source A outputs a PTAT voltage (referred to as "Tvptat" in the first embodiment), which has a positive temperature coefficient in proportion to the absolute temperature, as well as a voltage Vptat', which also has a positive temperature coefficient and is obtained from Tvptat through a voltage-divider. Tvptat is supplied to the comparison circuit for the comparison with the reference voltage. On the other hand, Vptat' is supplied to the second voltage generating circuit for obtaining a reference voltage.

The second voltage generating circuit B generates a voltage having a negative temperature coefficient, and adds this voltage to Vptat' supplied from the first voltage generating circuit A to output a first reference voltage Vref. The second voltage generating circuit B also outputs a second reference voltage Tvref, which is obtained form Vref through voltage conversion at a predetermined ratio. Both the first and second reference voltages Vref and Tvref are independent of the temperature coefficient.

The comparison circuit C compares Tvptat output from the first voltage generating circuit A with the second reference voltage Tvref output from the second voltage generating circuit B, and outputs a comparison result Tout.

The first voltage generating circuit A makes use of the principle of difference in gate work function, and therefore, it is capable of producing Tvptat and Vptat' at high precision almost up to the marginal operating temperature of the semiconductor device. The second voltage generating circuit B also makes use of the principle of difference in gate work function when producing the voltage having a negative temperature coefficient. Consequently, Vref and Tvref can be generated in a stable manner almost up to the marginal operative temperature of the semiconductor device.

Figure 4:
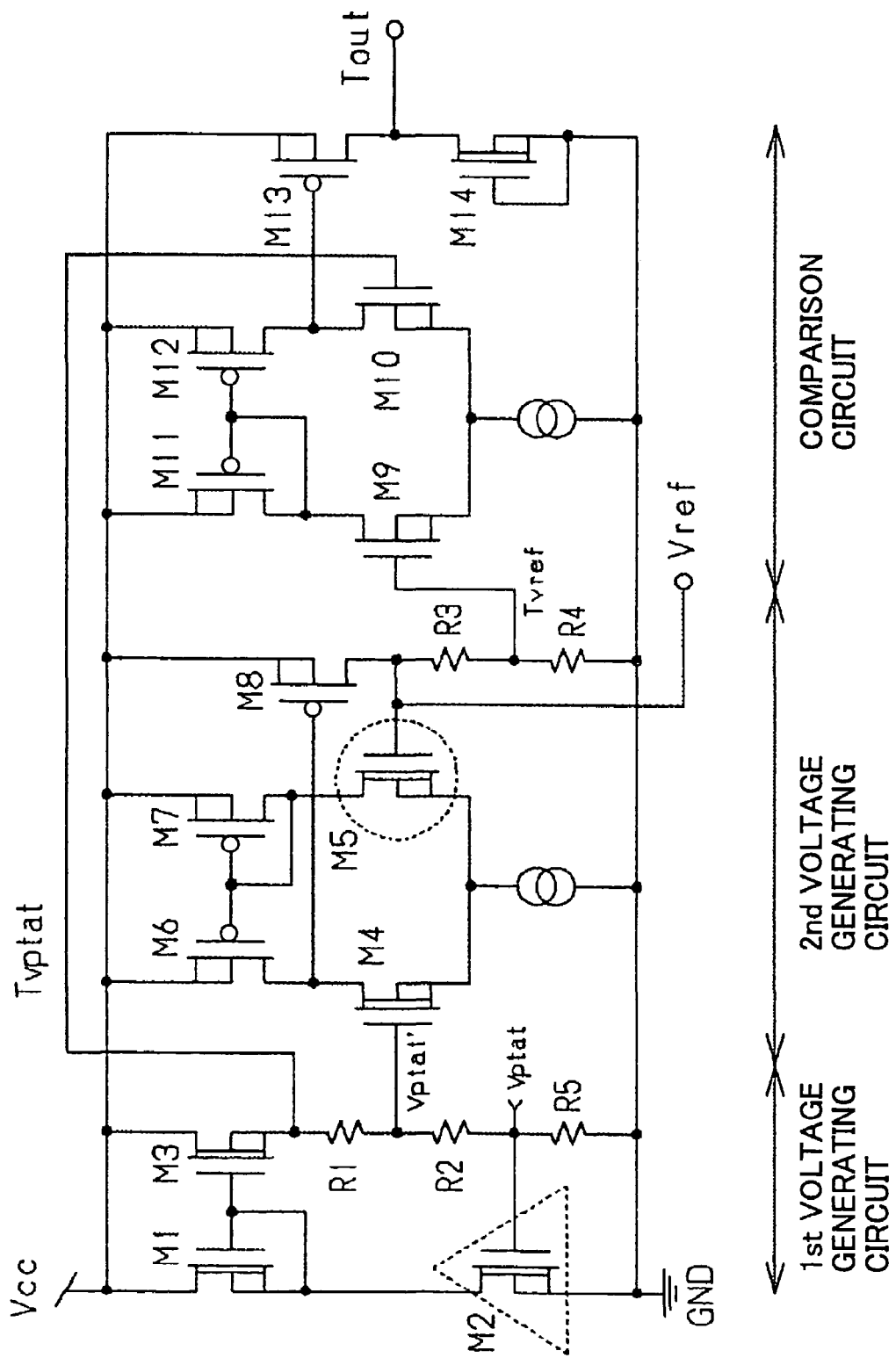
FIG. 4 is a circuit diagram of the temperature sensor shown in FIG. 3.

FIG. 4 is a circuit diagram of the temperature sensor shown in FIG. 3. In the example shown in FIG. 4, the circuit of the temperature sensor is formed on an n-type substrate.

The first voltage generating circuit comprises n-channel field effect transistors (hereinafter, simply referred to as "n-type transistor") M1, M2, and M3, and resistors R1, R2 and R5. Transistors M1 and M2 are formed in the p-type well of the n-type substrate, and have the same impurity concentration at the channel regions and the source/drain regions. The electric potential of the substrate of each transistor is equal to the source potential. The ratios (W/L) of the channel width W to the channel length L of the transistors M1 and M2 are set equal to each other.

Transistor M1 has a highly-doped n-type gate, and transistor M2 has a lightly-doped n-type gate. Transistors M1 and M2 are connected in series. The gate of transistor M1 is coupled to its source. Thus, the transistor M1 is used as a constant-current source. Transistor M3 and resistors R1, R2, and R5, which are connected in series, comprise a source follower. While Tvptat is output from the junction point between the source of transistor M3 and resistor R1, Vptat' is output from the junction point between resistors R1 and R2. The electric potential between resistors R2 and R5, which is represented as Vptat, is connected to the gate of transistor M2. The Vptat represents a physical quantity originally generated in proportion to the absolute temperature. Tvptat and Vptat' are obtained from Vptat through voltage conversion at predetermined ratios.

The second voltage generating circuit comprises n-type transistors M4 and M5, p-channel field effect transistors (hereinafter, simply referred to as "p-type transistors") M6, M7, M8, and resistors R3 and R4. Transistors M4 and M5 are formed in the p-type well of the n-type substrate, and have the same impurity concentration of the substrate and the channel dope regions. The electric potential of the substrate of each transistor is equal to the source potential. The ratios (W/L) of the channel width W to the channel length L of the transistors M4 and M5 are set equal to each other.

Transistor M4 has a highly-doped n-type gate, and transistor M5 has a highly-doped p-type gate. The pair of transistors M4 and M5, which are substantially the same except for the gate polarities, function as input transistors of a differential amplifier. Transistors M6 and M7 form a current-mirror circuit, and therefore, the same quantity of electric current flows through the drains of transistors M4 and M5. The differential amplifier (M4 and M5) and transistor M8 form a feedback loop. The voltage Vref at the gate of transistor M5 is divided between resistors R3 and R4, and supplied as Tvref to the comparison circuit.

The comparison circuit comprises n-type transistors M9, M10, and M14, and p-type transistors M11, M12, and M13. Transistors M11 and M12 form a current-mirror circuit. Transistors M9 and M10 are input transistors of a differential amplifier. Tvref is applied to the gate of transistor M9 from the second voltage generating circuit, and Tvptat is applied to the gate of transistor M10 from the first voltage generating circuit. This differential amplifier (M9 and M10) is used as a comparator. The output of the differential amplifier is supplied to the output buffer consisting of p-type transistor M13 and n-type transistor M14. The output of the output buffer is Tout, which is the output of the comparison circuit.

In FIG. 4, the n-type transistor M2 with a lightly-doped n-type gate is marked with a triangle, while the n-type transistor M5 with a highly doped p-type gate is circled, because these transistors are not ordinary. This arrangement applies to the subsequent modifications and embodiments.

In operation, in the first voltage generating circuit, the same drain current flows through the pair of transistors M1 and M2 that are of the same conductivity type and with different impurity concentrations. Since the potential difference between the source and the gate (i.e., the source-gate voltage) of transistor M1 is 0V, the potential difference between the source-gate voltages of transistors M1 and M2 is equal to the source-gate voltage of transistor M2, which then becomes a voltage in proportion to the absolute temperature. This voltage is referred to as Vptat.

Accordingly, Vptat' supplied to transistor M4 of the second voltage generating circuit becomes $$Vptat'=Vptat*(R2+R5)/R5. \quad (1)$$

On the other hand, Tvptat supplied to transistor M10 of the comparison circuit becomes $$Tvptat=Vptat*(R1+R2+R5)/R5 \quad (2)$$

Since Vptat has a positive temperature coefficient, Vptat' and Tvptat also have positive temperature coefficients.

In the second voltage generating circuit, a pair of transistors M4 and M5 having opposite gate polarities function as input transistors of the differential amplifier, while p-type transistors M6 and M7 form a current-mirror circuit. Accordingly, the same quantity of electric current flows through the drains of transistors M4 and M5. The differential amplifier (M4 and M5) and transistor M8 form a feedback loop, and therefore, input offset Vpn is generated between the gate of transistor M4 and the gate of transistor M5. The offset voltage Vpn has a negative temperature coefficient.

Consequently, when Vptat' is applied to the gate of transistor M4 from the first voltage generating circuit, a certain voltage Vx that is produced by adding the offset voltage Vpn to Vptat' appears at the gate of transistor M5.

Because Vx is the sum of Vptat' having a positive temperature coefficient and Vpn having a negative temperature coefficient, Vx does not have a temperature characteristic, and it becomes a constant reference voltage Vref. Voltage Tvref supplied to the transistor M9 of the comparison circuit can be obtained from Vref. Tvref is expressed as $$Tvref=Vref*R4/(R3+R4). \quad (3)$$

The product Tvref does not have a temperature coefficient.

In the comparison circuit, p-type transistors M11 and M12 form a current-mirror circuit, and a pair of n-type transistors M9 and M10 are the input transistors of the differential amplifier. Tvref is input to the gate of the transistor M9 from the second voltage generating circuit, and Tvptat is input to the gate of the transistor M10 from the first voltage generating circuit. Since Tvref does not have a temperature coefficient, it is constant even if the temperature changes. On the other hand, Tvpat has a positive temperature coefficient, and the voltage Tvpat increases in proportion to the temperature rise, as illustrated in FIG. 5.

Figure 5:
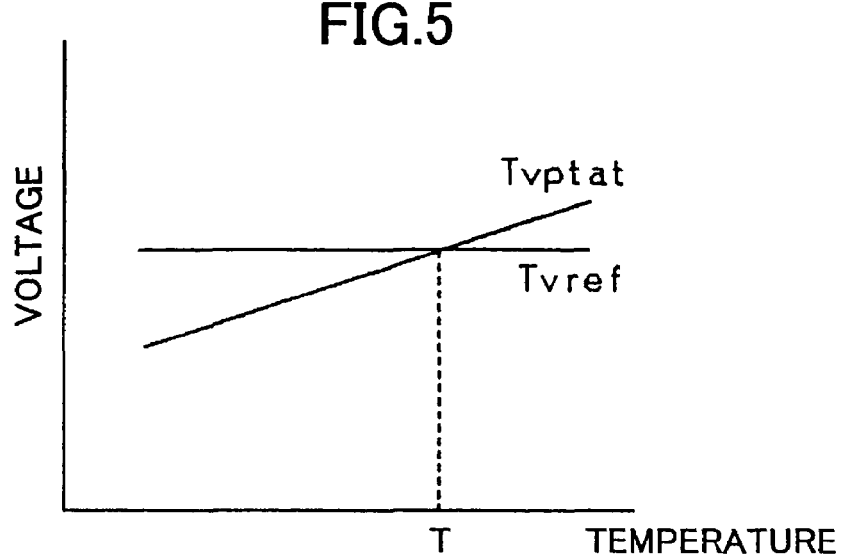
FIG. 5 is a graph showing Tvptat voltage and Tvref voltage as a function of temperature, which are generated by the circuit shown in FIG. 4.
Figure 6:
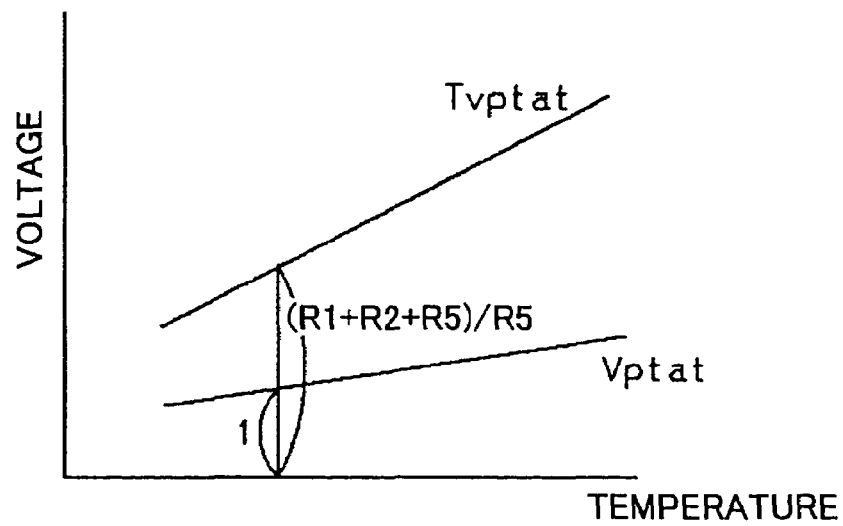
FIG. 6 is a graph showing the Tvptat voltage and Vptat voltage as a function of temperature, which are output from the first voltage generating circuit shown in FIG. 4.

Either Tvref or Tvpat is adjusted so that the characteristic lines of these two voltages cross each other at a desired temperature T selected to protect the semiconductor integrated circuit, as illustrated in FIG. 5. If the detected temperature is below the selected temperature T, Tvptat is smaller than Tvref (Tvptat<Tvref), and the output from the comparator (M9, M10) becomes High. The output Tout of the temperature sensor becomes Low.

If the temperature rises and the detected temperature exceeds the selected temperature T, then Tvptat becomes greater than Tvref (Tvptat>Tvref). The output of the comparator (M9, M10) becomes Low, and the final output of the temperature sensor becomes High. The output signal Tout is used as a chip enable signal to protect the semiconductor integrated circuit.

Tvref can be set to a desired level by adjusting the ratio of R3 to R4, as expressed in equation (3). In order to set Tvptat to a desired level, the ratio of (R1+R2+R5) to R5 is adjusted, as expressed in equation (2).

Since Tvptat equals Vptat*(R1+R2+R5)/R5, the temperature slope, that is, the voltage change Δ Tvptat with respect to a temperature change of one degree also equals (R1+R2+R5)/R5 times ΔVptat. If the slope of Tvptat (ΔTvptat) is set large, variation in Tvref due to fluctuation of the ratio R3 to R4 can be absorbed, as long as the variation is within ΔTvptat. Accordingly, a highly sensitive temperature sensor can be realized by setting the slope of Tvptat large.

Figure 7:
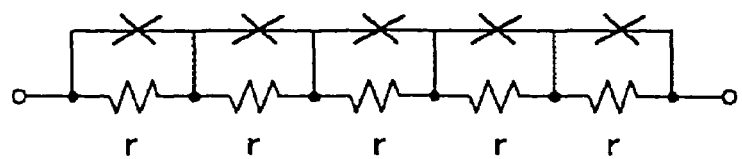
FIG. 7 illustrates a series of resistance, which can be trimmed to adjust the Tvptat and Tvref output from the first voltage generating circuit.

On the other hand, if the slope of Tvptat (ΔTvptat) is set small, the output voltage Tvptat will not rise too much even if the detected temperature reaches the target temperature T. Accordingly, the operational voltage of the temperature sensor can be maintained low. The level of Tvptat can be regulated easily by adjusting resistance R1, R2, and R3. Tvref can also be regulated easily by adjusting resistance R3 and R4. The ratio of the resistances may be fixed to a preferred value during the fabrication of the circuit. Alternatively, the resistance values of each resistor may be adjusted by laser-trimming the resistors at the cross-marked positions shown in FIG. 7, after the circuit is fabricated.

The reference voltage Vref generated by the second voltage generating circuit can be used as an external reference voltage supplied to the semiconductor integrated circuit. Since the above-described voltages are generated making use of the difference in work function of the gate, these voltages can be output accurately even at or near the marginal operating temperature of the semiconductor device, without being adversely affected by the actual operation temperature.

Figure 8:
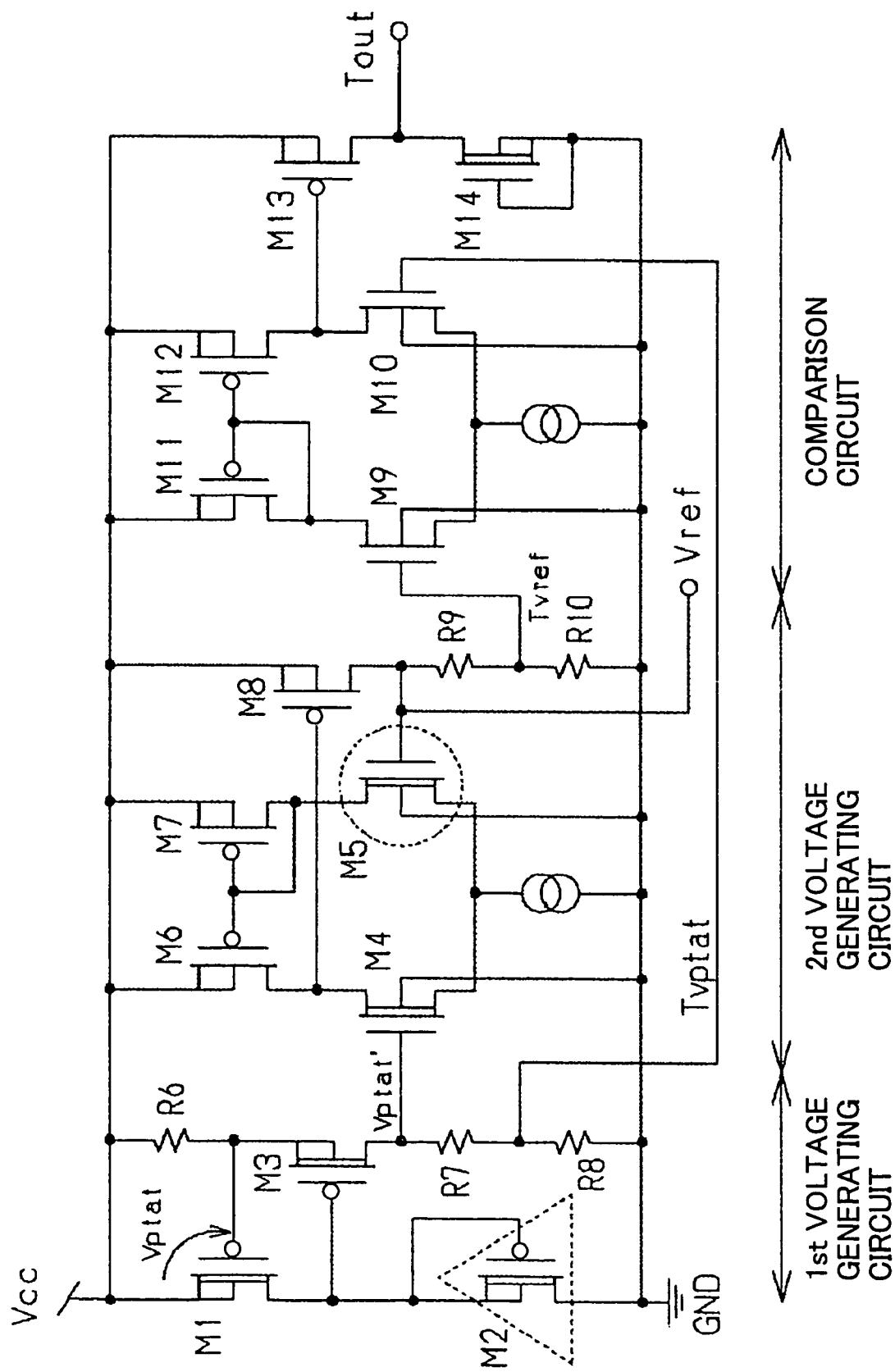
FIG. 8 is a circuit diagram showing a modification of the temperature sensor according to the first embodiment.

FIG. 8 illustrates a modification of the temperature sensor of the first embodiment. In the modification, the temperature sensor is formed on a p-type substrate. The temperatures sensor comprises a first voltage generating circuit, a second voltage generating circuit, and a comparison circuit, as in the circuit shown in FIG. 4.

The first voltage generating circuit comprises p-type transistors M1, M2, and M3, and resistors R6, R7 and R8. Transistors M1 and M2 are formed in the n-type well of the p-type substrate, and have the same impurity concentration at the channel regions and the source/drain regions. The electric potential of the substrate of each transistor is equal to the source potential. The ratios (W/L) of the channel width W to the channel length L of the transistors M1 and M2 are set equal. Transistor M2 has a lightly-doped n-type gate, and it is used as a constant current source with the gate connected to its source.

Transistor M1 has a highly doped n-type gate, and its gate voltage is defined by the source follower circuit comprised of transistor M3 and resistor R6. The electric potential between the source and gate (i.e., the source-gate voltage) of transistor M1 is Vptat, which is originally produced in proportion to the absolute temperature. Voltage Vptat' is extracted from the drain of transistor M3. Another voltage Tvptat is extracted from the junction point between resistor R7 and R8.

The second voltage generating circuit comprises n-type transistors M4 and M5, p-type transistors M6, M7, and M8, and resistors R9 and R10. Transistors M4 and M5 are formed in the p-type substrate, and have the same impurity concentration of the substrate and the channel dope regions. The electric potential of the substrate of each transistor is equal to the ground potential. The ratios (W/L) of the channel width W to the channel length L of the transistors M4 and M5 are set equal to each other.

Transistor M4 has a highly-doped n-type gate, and transistor M5 and a highly-doped p-type gate. The pair of transistors M4 and M5 function as input transistors of a differential amplifier. The p-type transistors M6 and M7 form a current-mirror circuit. The differential amplifier (M4 and M5) and p-type transistor M8 form a feedback loop. Reference voltage Vref is output from the differential amplifier (M4, M5). By dividing Vref between resistors R9 and R10, another reference voltage Tvref is produced and supplied to the comparison circuit.

The comparison circuit comprises n-type transistors M9, M10, and M14, and p-type transistors M11, M12, and M13. Transistors M11 and M12 form a current-mirror circuit. Transistors M9 and M10 function as input transistors of a differential amplifier. Tvref is applied to the gate of transistor M9 from the second voltage generating circuit, and Vptat is applied to the gate of transistor M10 from the first voltage generating circuit. The output of the differential amplifier (M9 and M10) is supplied to the output buffer consisting of p-type transistor M13 and n-type transistor M14. The output of the output buffer is Tout, which is the output of the comparison circuit.

In operation, in the first voltage generating circuit, the same quantity of electric current flows through the pair of transistors M1 and M2, and the source-gate voltage of transistor M1 becomes Vptat, as in the previous example.

Since electric current flowing through resistor R6 also flows through resistors R7 and R8, Vptat' is expressed as $$Vptat'=Vptat*(R7+R8)/R6. \quad (4)$$

Furthermore, Tvptat extracted from the junction point between R7 and R8 is expressed as $$Tvptat=Vptat*R8/(R7+R8). \quad (5)$$

Because Vptat has a positive temperature coefficient, Vptat' and Tvptat also have positive temperature coefficients.

In the second voltage generating circuit, a pair of transistors M4 and M5 having opposite gate polarities function as input transistors of the differential amplifier, and p-type transistors M6 and M7 form a current-mirror circuit. Accordingly, the same quantity of electric current flows through the drains of transistors M4 and M5. The differential amplifier (M4 and M5) and transistor M8 form a feedback loop, and accordingly, an input offset Vpn occurs between the gate of transistor M4 and the gate of transistor M5. The offset Vpn has a negative temperature coefficient.

Consequently, when Vptat' is applied to the gate of the transistor M4 from the first voltage generating circuit, the reference voltage Vref, which is the sum of Vptat' and Vpn, appears at the gate of the transistor M5.

Because Vref is obtained by adding Vpn having a negative temperature coefficient to Vptat' having a positive temperature coefficient, Vref does not have a temperature characteristic. This Vref becomes a constant reference voltage. Another reference voltage Tvref is produced from Vref, which is to be supplied to the transistor M9 of the comparison circuit. Tvref is expressed as $$Tvref=Vref*R10/(R9+R10). \quad (6)$$

The product Tvref does not have a temperature coefficient.

In the comparison circuit, p-type transistors M11 and M12 form a current-mirror circuit, and a pair of n-type transistors M9 and M10 function as input transistors. Tvref is input to the gate of the transistor M9 from the second voltage generating circuit, and Tvptat is input to the gate of the transistor M10 from the first voltage generating circuit. Since Tvref does not have a temperature coefficient, it is constant even if the temperature changes. On the other hand, Tvpat has a positive temperature coefficient, and the voltage Tvpat increases in proportion to the temperature rise.

If the detected temperature is below the selected temperature T, Tvptat is smaller than Tvref (Tvptat<Tvref), and the output from the comparator (M9, M10) becomes High. Consequently, the output Tout of the comparison circuit becomes Low. If the temperature rises and the detected temperature exceeds the selected temperature T, then Tvptat becomes greater than Tvref (Tvptat>Tvref). The output of the comparator (M9, M10) becomes Low, and the final output of the comparison circuit becomes High. The output signal Tout is used as a chip enable signal to protect the semiconductor integrated circuit.

Tvref can be set to a desired level by adjusting the ratio of R9 to R10. To set Tvptat to a desired level, the ratio (R7+R8)/R6 is adjusted.

Figure 9:
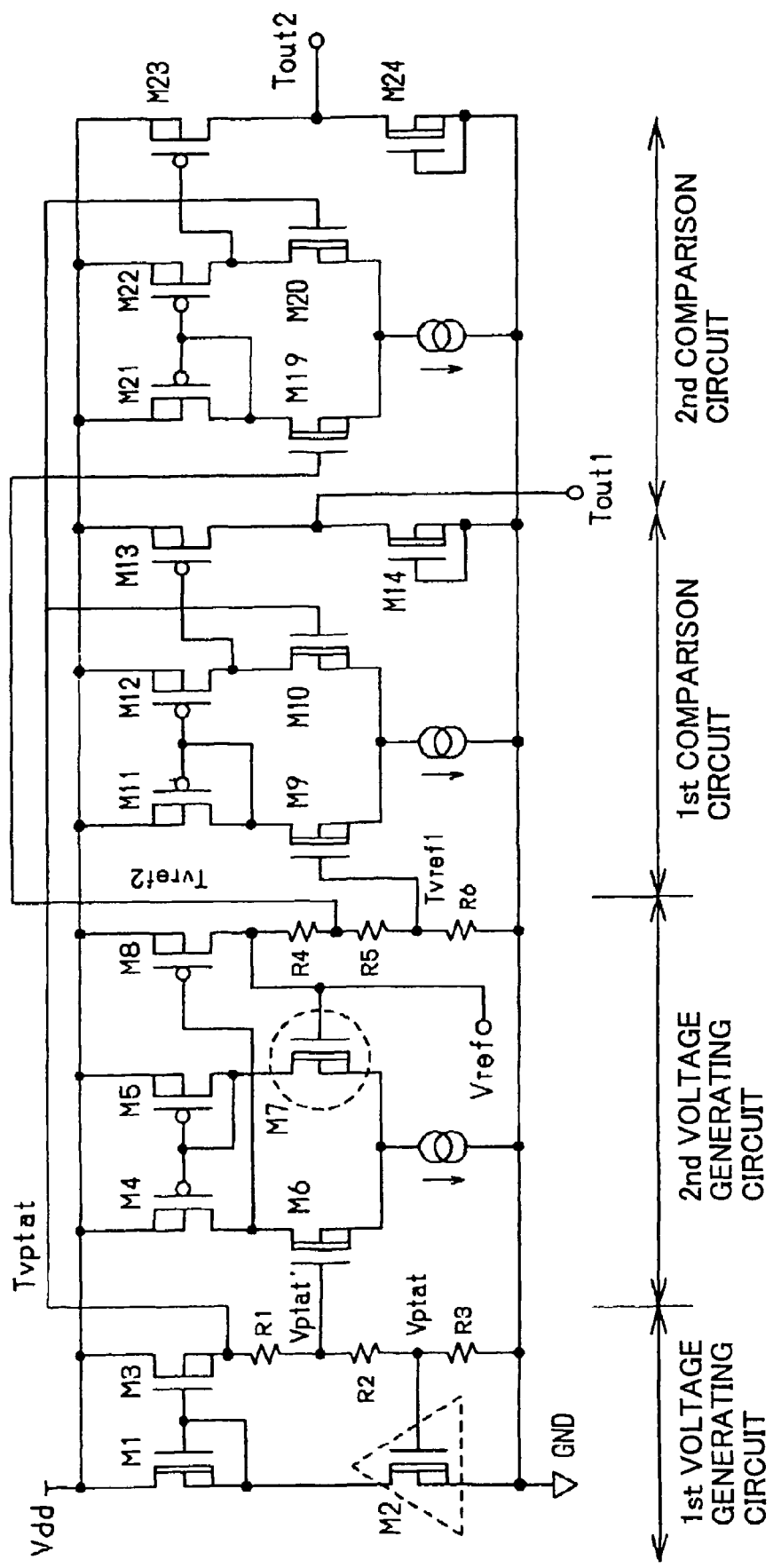
FIG. 9 is a circuit diagram showing another modification of the temperature sensor according to the first embodiment.

FIG. 9 illustrates a second modification of the first embodiment. In the second modification, the temperature sensor has two comparison circuits to sense two different temperatures. The second voltage generating circuit generates two types of reference voltage Tvref1 and Tvref2, which are supplied to the first and second comparison circuits, respectively. The first voltage generating circuit generates Vptat in proportion to the absolute temperature, and creates Tvptat and Vptat' based on Vptat. The Tvptat is supplied to the first and second comparison circuits for the comparison with the first and second reference voltages Tvref1 and Tvref2, respectively.

Figure 10:
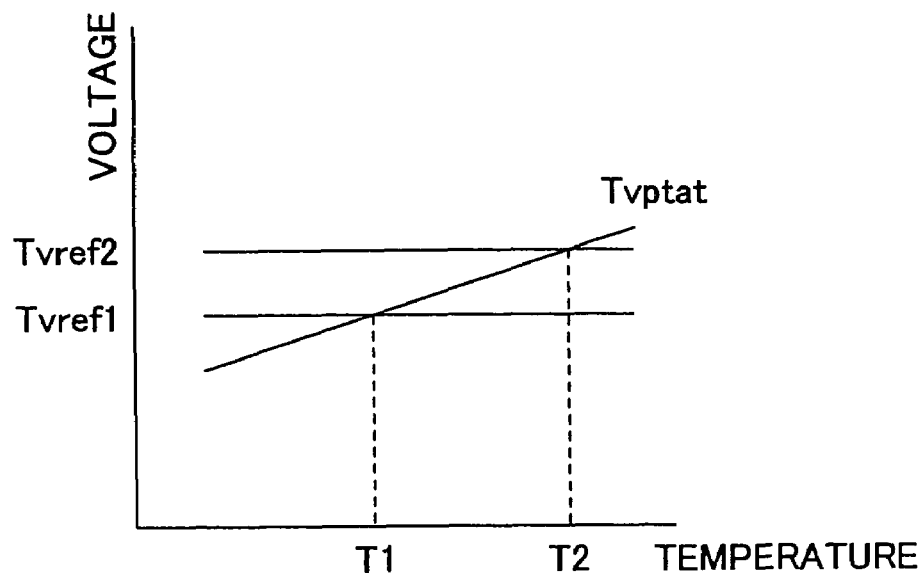
FIG. 10 is a graph used to explain the operation of the temperature sensor shown in FIG. 9.

With this temperature sensor, the first temperature T1 is detected using the first reference Tvref1, and the second temperature is detected using the second reference Tvref2, as illustrated in FIG. 10. This modification is advantageous because the operation of the semiconductor integrated circuit can be controlled more flexibly and precisely by slowing down the operation rate of the semiconductor integrated circuit at the first temperature T1, and by stopping the operation of the semiconductor integrated circuit at the second temperature T2.

Figure 11:
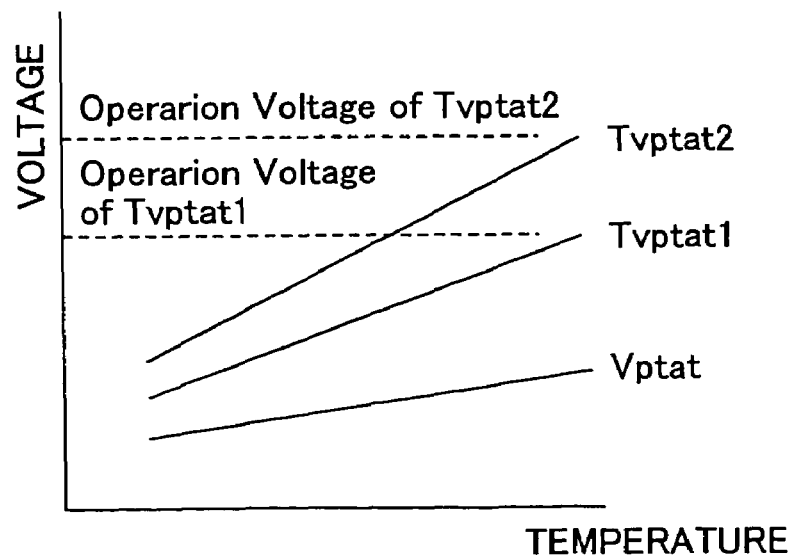
FIG. 11 is a graph used to explain the relation between the sensitivity and the operation voltage in the temperature sensor of the first embodiment.

FIG. 11 illustrates the temperature slope of the Tvptat output from the first voltage-generating circuit, as a function of temperature. As has been described above, the slope of Tvptat is adjustable to a desired level through a voltage-divider. When the slope (that is, the temperature coefficient) is set to Tvptat 2, which is greater than Tvptat 1, the sensitivity is improved. However, the operating voltage also rises, and according, low-voltage operation becomes difficult at or near the target temperature. On the other hand, by setting the slope smaller as in the case of Tvptat 1, the temperature sensor can operate at a low voltage.

In this manner, with the temperature sensor of the first embodiment, either sensitive temperature detection or a low-voltage operation can be realized by adjusting the slope of Tvptat using a simple voltage-divider.

In addition, a stable and constant reference voltage can be produced by generating an offset voltage having a slope with a polarity opposite to the PTAT voltage.

As a whole, the temperature sensor can operate precisely even at or near the marginal operating temperature of the semiconductor device.

In the first embodiment, the first voltage generating circuit generates a voltage having a positive temperature coefficient, while the second voltage generating circuit generates a voltage having a negative temperature coefficient. However, a voltage with a negative coefficient may be generated from the first voltage generating circuit, while a voltage with a positive temperature coefficient is generated by the second voltage generating circuit.

Any type of temperature detection circuit can be used as the first voltage generating circuit of the first embodiment, as long as it can generate a voltage in proportion to the absolute temperature. Such a voltage can be used in place of Tvptat with a positive temperature coefficient in the first embodiment.

Although, in the first embodiment, Vptat' is supplied from the first voltage generating circuit to the second voltage generating circuit, Vptat' may be generated in the second voltage generating circuit. In this case, the second voltage generating circuit produces the reference voltage by adding Vpn to Vptat', both of which are generated in the second voltage generating circuit so as to have opposite sign of temperature coefficients.

<Second Embodiment>

Figure 12:
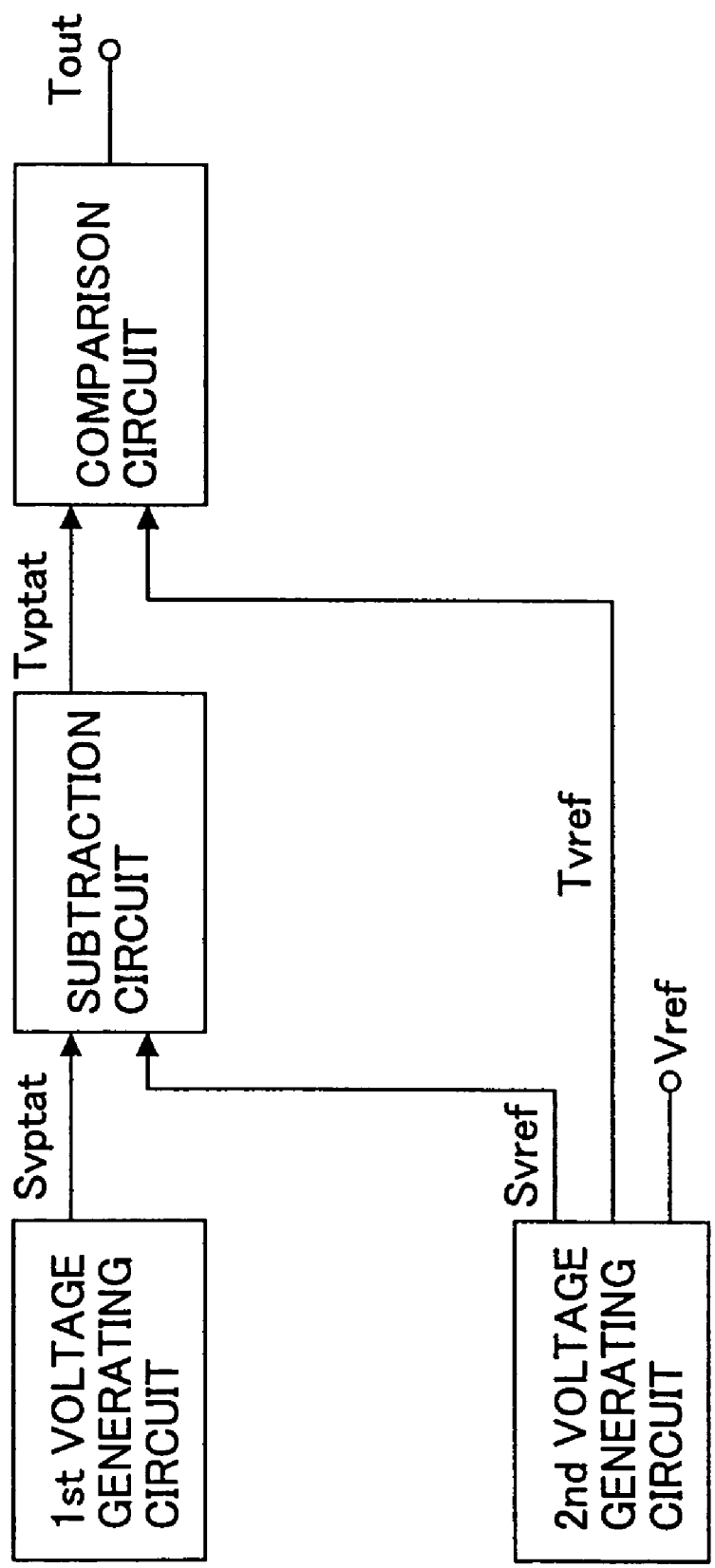
FIG. 12 is a block diagram of the temperature sensor according to the second embodiment of the invention.

FIG. 12 is a block diagram of the temperature sensor according to the second embodiment. The temperature sensor comprises a first voltage generating circuit, a second voltage generating circuit, a subtraction circuit, and a comparison circuit. In the second embodiment, the output of the subtraction circuit is compared with the reference voltage. This arrangement is capable of reducing the operating voltage, while maintaining high sensitivity.

The first voltage generating circuit generates a voltage Svptat in proportion to the absolute temperature. Svptat has either a positive or negative temperature coefficient. This Svptat is supplied to the subtraction circuit. The second voltage generating circuit generates a first reference voltage Vref, a second reference voltage Tvref, and a third reference voltage Svref, none of which has a temperature coefficient. While the second reference voltage Tvref is supplied to the comparison circuit, the third reference voltage Svref is supplied to the subtraction circuit. The subtraction circuit amplifies the difference between Svptat and Svref, and outputs Tvptat to the comparison circuit. The comparison circuit compares the Tvptat with Tvref to output a comparison result Tout.

In the second embodiment, the second voltage generating circuit makes use of the principle of difference in gate work function, while the first voltage generating circuit may or may not utilize the difference of gate work function.

Figure 13:
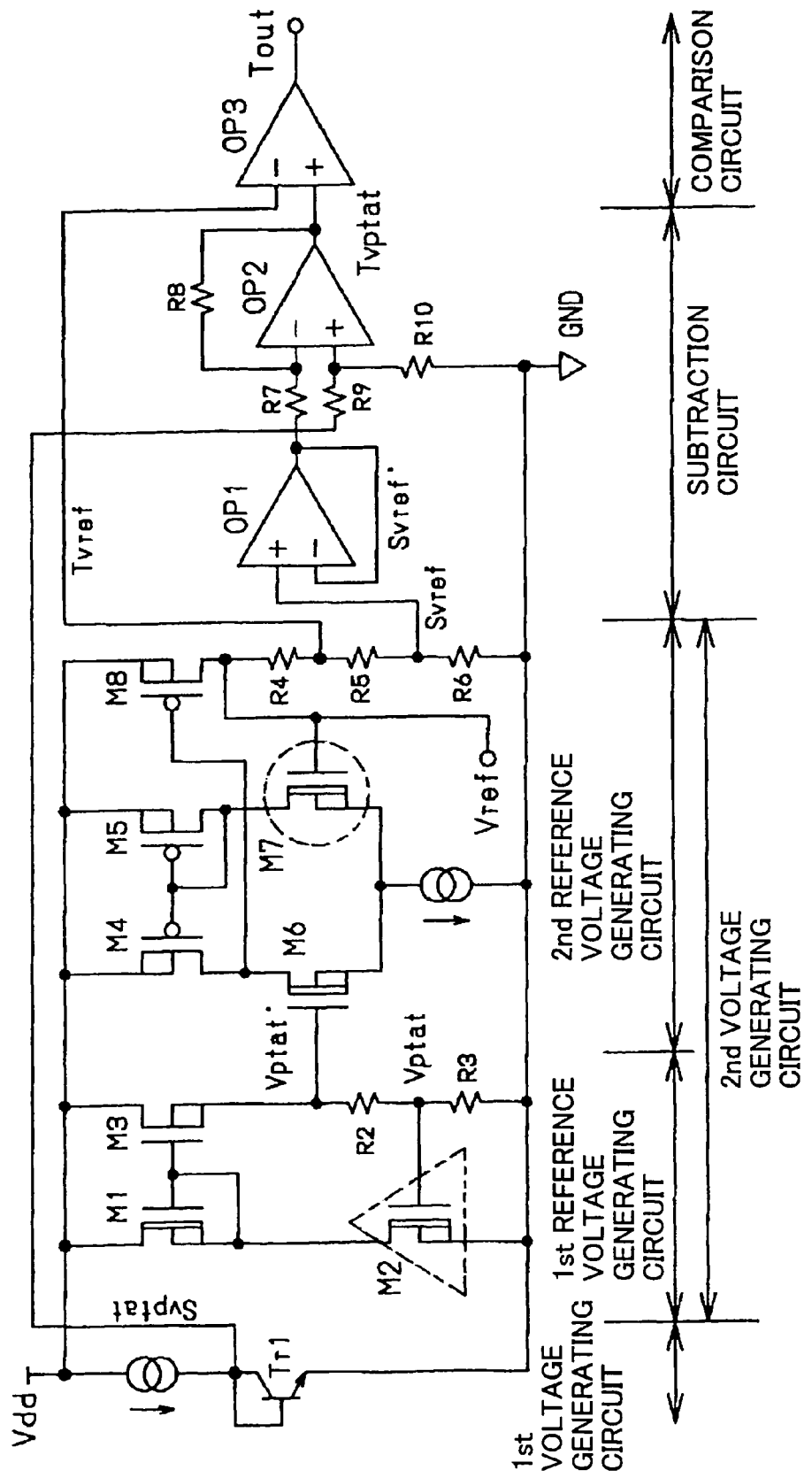
FIG. 13 is a circuit diagram of the temperature sensor shown in FIG. 12.

FIG. 13 is a circuit diagram of the temperature circuit shown in FIG. 12. This circuit is formed in an n-type substrate. The first voltage generating circuit is comprised of an NPN transistor Tr1. The base of Tr1 is coupled to its collector, and the emitter is connected to the ground voltage GND, thereby outputting Svptat from the collector. The NPN transistor Tr1 can be fabricated by forming a base connected to the p-type well formed in the n-type substrate, and forming an emitter and a collector connected to the n-type diffusion layers formed in the p-type well.

The second voltage generating circuit is comprised of a first reference voltage generating circuit and a second reference voltage generating circuit. The first reference voltage generating circuit produces voltage Vptat'. Vptat' is supplied to the second reference voltage generating circuit to create the reference voltage.

The first reference voltage generating circuit includes n-type transistors M1, M2, and M3, and resistors R2 and R3. The n-type transistors M1 and M2 are formed in the p-well of the n-type substrate, and have the same impurity concentration at the substrate and channel dope regions. The substrate potential of each transistor is equal to its source voltage. The n-type transistor M1 has a highly-doped n-type gate, and n-type transistor M2 has a lightly doped n-type gate. The ratios (W/L) of the channel width W to the channel length L of these two transistors are equal to each other.

The n-type transistors M1 and M2, which are substantially the same except for the impurity concentrations of the gates, are connected in series. The gate of n-type transistor M1 is coupled to its source. The transistor M1 is used as a constant-current source.

N-type transistor M2 has a gate voltage defined by the source follower formed by n-type transistor M3 and resistors R2 and R3. Vptat is extracted from the junction point between resistors R2, R3, and the gate of n-type transistor M2 Vptat' is extracted from the junction point between the source of n-type transistor M3 and resistor R2.

The second reference voltage generating circuit comprises p-type transistors M4, M5, and M8, n-type transistors M6 and M7, and resistors R4, R5, and R6. The n-type transistors M6 and M7 are formed in the p-type well of the n-type substrate, and have the same impurity concentration of the substrate and the channel dope regions. The electric potential of the substrate of each transistor is equal to the source potential. The n-type transistor M6 has a highly-doped n-type gate, while the n-type transistor M7 has a highly-doped p-type gate. The ratios (W/L) of the channel width W to the channel length L of the transistors M6 and M7 are set equal to each other.

The pair of transistors M6 and M7, which are the substantially same except for the gate polarities, function as input transistors of a differential amplifier. The p-type transistors M4 and M5 form a current-mirror circuit. The voltage Vptat' is applied to the gate of n-type transistor M6 from the first reference voltage generating circuit. The gate of n-type transistor M7 is connected to the first reference voltage Vref, which is extracted from the drain of p-type transistor M8 as the output of the differential amplifier.

Based on the first reference voltage Vref, the second and third reference voltages Tvref and Svref are produced through voltage conversion using resistors R4, R5, and R6. The second reference voltage Tvref is output from the junction point between resistors R4 and R5, and supplied to the comparison circuit. The third reference voltage Svref is output from the junction point between resistors R5 and R6, and supplied to the subtraction circuit.

The subtraction circuit includes operational amplifiers OP1 and OP2, and resistors R7, R8, R9, and R10. The output Svref' of the operational amplifier OP1 is connected to the inversion input of the operational amplifier OP1 itself, while the non-inversion input of the operational amplifier receives the third reference voltage Svref supplied from the second reference voltage generating circuit. The output Svref' of the operational amplifier OP1 is supplied via resistor R7 to the inversion input of the operational amplifier OP2. The output Tvptat of the operational amplifier OP2 itself is also connected via resistor R8 to the inversion input of the operational amplifier OP2. On the other hand, the non-inversion input of the operational amplifier OP2 receives Svptat from the first voltage generating circuit via resistor R9. The non-inversion input of the operational amplifier OP2 is also connected via resistor R10 to the ground voltage GND. The output Tvptat from the second operational amplifier OP2 becomes the output of the subtraction circuit, and is supplied to the comparison circuit.

The comparison circuit comprises an operational amplifier OP3. The second reference voltage Tvref generated by the second reference voltage generating circuit is input to the inversion input of the operational amplifier OP3, and Tvptat supplied from the subtraction circuit is input to the non-inversion input of the operational amplifier OP3. The output Tout of the third operational amplifier OP3 is a final output of the temperature sensor.

FIGS. 14A through 14D illustrate the temperature characteristics of the output signals generated in the temperature sensor shown in FIG. 13. The operation of the circuit shown in FIG. 13 will be explained with reference to these graphs.

Since the first voltage generating circuit uses a diode-connection of the NPN transistor, a voltage Svptat having a negative temperature coefficient (or slope) is generated in proportion to the absolute temperature, as illustrated in FIG. 14A.

Concerning the second voltage generating circuit, the n-type transistor M1 with its gate coupled to its source is used as a constant-current source, and two n-type transistors M1 and M2 are connected in series in the first reference voltage generating circuit. Since the same quantity of electric current flows through transistors M1 and M2 that have the gates of the same conductivity type but with different impurity concentrations, the potential difference between the source-gate voltage of transistor M1 and the source-gate voltage of transistor M2 becomes a PTAT voltage (Vptat) having a positive temperature coefficient.

Since the gate of transistor M1 is coupled to its source, there is no potential difference between the source and the gate. Therefore, the source-gate voltage of transistor M2 becomes the PTAT voltage (Vptat). From this Vptat, Vptat' that is to be supplied to the second reference voltage generating circuit is produced through a voltage divider consisting of resistors R2 and R3. Vptat' is expressed as $$Vptat'=Vptat*(R2+R3)/R3 \quad (7)$$

Since Vptat has a positive temperature coefficient, Vptat' also has a positive temperature coefficient.

In the second reference voltage generating circuit, p-type transistors M4 and M5 form a current mirror circuit, and n-type transistors M6 and M7 with opposite gate polarities function as input transistors of the differential amplifier. Accordingly, the same quantity of electric current flows through the n-type transistors M6 and M7. In addition, because the differential amplifier (M6 and M7) and p-type transistor M8 form a feedback loop, an input offset Vpn having a negative temperature coefficient appears between the source-gate voltage of n-type transistor M6 and the source-gate voltage of n-type transistor M7, as described in U.S. Pat. No. 6,437,550.

When Vptat' is applied to the gate of transistor M6 from the first reference voltage generating circuit, the first reference voltage Vref, which is the sum of Vptat' and Vpn, is generated between the source and the gate of the n-type transistor M7. Since Vref is obtained by adding Vpn having a negative temperature coefficient to Vptat' obtained from Vptat through the voltage-divider at a predetermined ratio, the resultant Vref does not have a temperature coefficient. Based on the first reference voltage Vref, the second and third reference voltages Tvref and Sverf are generated through the voltage divider using resistors R4, R5 and R6. The reference voltages Vref, Tvref, and Svref are expressed by equations (8), (9), and (10).

$$Vref=Vptat*(R2+R3)/R3+Vpn=Vptat'+Vpn \quad (8)$$

$$Tvref=Vref*(R5+R6)/(R4+R5+R6) \quad (9)$$

$$Svref=Vref*R6/(R4+R5+R6) \quad (10)$$

FIG. 14B exhibits the characteristics of these reference voltages. As shown in the graph, the first reference voltage Vref is generated by adding Vptat', which has a positive temperature coefficient and is supplied from the first reference voltage generating circuit, to Vpn, which has a negative temperature coefficient and is generated in the second reference voltage generating circuit. The second and third reference voltages Tvref and Svref are generated by converting Vref at predetermined ratios defined by equation (9) and (10), respectively. Consequently, both Tvref and Svref are constant without having a temperature coefficient.

FIG. 14C shows the temperature characteristics of voltages produced in the subtraction circuit, which includes operational amplifiers OP1 and OP2, and resistors R7, R8, R9, and R10. Since the operational amplifier OP1 is used as a voltage follower, an Svref', which has the same potential as the third reference voltage Svref supplied to the non-inversion input of OP1, is obtained from the operational amplifier OP1. The operational amplifier OP1 is inserted for the purpose of preventing an electric current path from being produced between Tvptat (output of the operational amplifier Op2) and the third reference voltage Svref via resistors R8, R7, and R6, because such an electric current path causes the reference voltages produced in the second voltage generating circuit to fluctuate.

The operational amplifier OP2 is used as a differential amplifier. By setting R7 equal to R9 (R7=R9) and setting R8 equal to R10 (R8=R10), the output Tvptat of the operational amplifier OP2 becomes $$Tvptat=(R8/R7)*(Svptat-Svref') \quad (11)$$

as is known in the art. When the temperature is lower than T1, Svptat is greater than Svref (Svptat>Svref), and therefore, equation (11) applies. The subtraction result of (Svptat-Svref') of the right-hand side of equation (11) is illustrated as the dotted line A in FIG. 14C. This subtraction result is amplified by resistors R8 and R7 to obtain Tvptat. On the other hand, if the temperature is higher than T1, Svptat is smaller than Svref (Svptat<Svref), and the subtraction result is treated as 0 volts. Consequently, even if the ratio R8 to R7 (R8/R7) is increased, which means, even if the slope or the temperature coefficient of Tvptat is increased, for the purpose of improving the sensitivity to realize a highly precise temperature sensor, low-voltage operation is guaranteed because the Tvptat is reduced by a voltage corresponding to Svref that equals the third reference voltage Svref.

FIG. 14D shows the temperature characteristics of the signals treated in the comparison circuit. The comparison circuit is comprised of operational amplifier OP3. The operational amplifier OP3 is used as a comparator. If the temperature is lower than T, Tvref is smaller than Tvptat (Tvref<Tvptat). Because the voltage at the non-inversion input is higher than that of the inversion input, the output Tout of the comparator is High. When the temperature is higher than T, then Tvref becomes greater than Tvptat (Tvref>Tvptat). Since the voltage at the inversion input is greater than that of the non-inversion input, the output Tout of the comparator becomes Low.

By using the output Tout as a control signal for a semiconductor integrated circuit, the operation of the semiconductor integrated circuit can be correctly stopped at a predetermined temperature T, while allowing the temperature sensor to operate at a low voltage. The first reference signal Vref is output externally from the temperature sensor, which may be used in the semiconductor integrated circuit.

Figure 15:
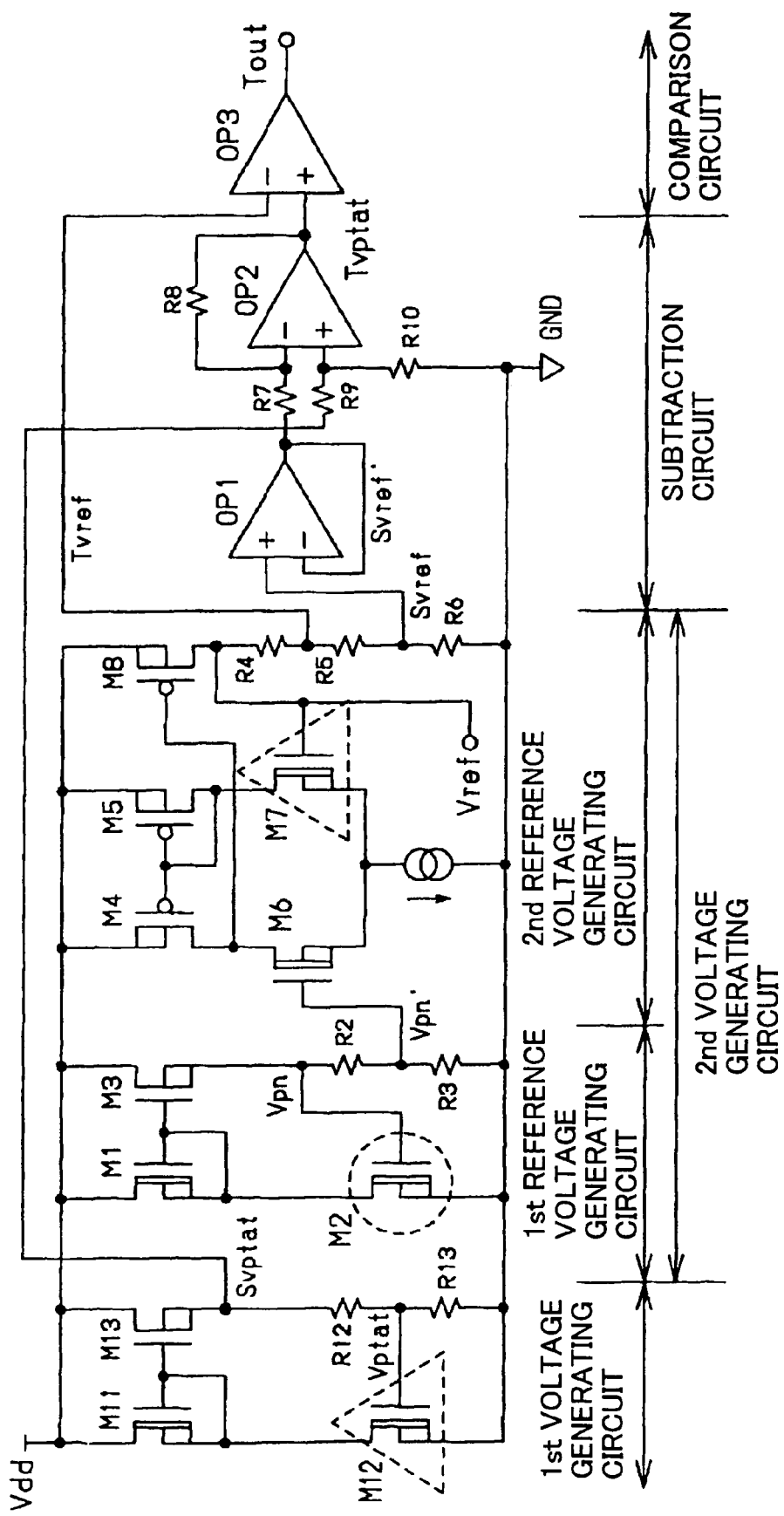
FIG. 15 is a circuit diagram of a modification of the temperature circuit of FIG. 13.

FIG. 15 is a circuit diagram of a modification of the temperature sensor shown in FIG. 12. This circuit is formed in an n-type substrate. In this modification, a PTAT voltage (Vptat) having a positive temperature coefficient is generated from the first voltage generating circuit. Both the first and second voltage generating circuits make use of the principle of difference in gate work function disclosed in U.S. Pat. No. 6,437,550.

The first voltage generating circuit comprises n-type transistors M11, M12, and M13, and resistors R12 and R13. Transistors M11 and M12 are formed in the p-type well of the n-type substrate, and have the same impurity concentration at the channel regions and the source/drain regions. The electric potential of the substrate of each transistor is equal to the source potential. The n-type transistor M11 has a highly-doped n-type gate, and the n-type transistor M12 has a lightly-doped n-type gate. The ratios (W/L) of the channel width W to the channel length L of the transistors M11 and M12 are set equal to each other.

Transistors M11 and M12, which are substantially the same except for the impurity concentrations of the gates, are connected in series. The gate of n-type transistor M11 is coupled to its source. This transistor M11 is used as a constant-current source. The n-type transistor M12 is furnished with a gate voltage by a source follower comprised of an n-type transistor M13 and resistors R12 and R13. The PTAT voltage (Vptat) is output from the junction point between the gate of n-type transistor M12 and resistors R12 and R13. Another voltage Svptat is output from the junction point between the source of n-type transistor M13 and resistor R12.

The second voltage generating circuit is comprised of a first reference voltage generating circuit and a second reference voltage generating circuit. The first reference voltage generating circuit includes n-type transistors M1, M2, and M3, and resistors R2 and R3. The n-type transistors M1 and M2 are formed in the p-well of the n-type substrate, and have the same impurity concentration at the substrate and channel dope regions. The substrate potential of each transistor is equal to its source voltage. The n-type transistor M1 has a highly-doped n-type gate, and n-type transistor M2 has a highly-doped p-type gate. The ratios (W/L) of the channel width W to the channel length L of these two transistors are equal to each other.

The n-type transistors M1 and M2, which are substantially the same except for the polarity of the gate, are connected in series. The gate of n-type transistor M1 is coupled to its source. This transistor M1 is used as a constant-current source. N-type transistor M2 has a gate voltage defined by the source follower formed by n-type transistor M3 and resistors R2 and R3. A voltage Vpn having a negative temperature coefficient is extracted from the junction point between the gate of n-type transistor M2 and the source of n-type transistor M3. A voltage Vpn' is extracted from the junction point between resistors R2 and R3.

The second reference voltage generating circuit comprises p-type transistors M4, M5, and M8, n-type transistors M6 and M7, and resistors R4, R5, and R6. The n-type transistors M6 and M7 are formed in the p-type well of the n-type substrate, and have the same impurity concentration of the substrate and the channel dope regions. The electric potential of the substrate of each transistor is equal to the source potential. The n-type transistor M6 has a highly-doped n-type gate, while the n-type transistor M7 has a lightly-doped n-type gate. The ratios (W/L) of the channel width W to the channel length L of the transistors M6 and M7 are set equal to each other.

The n-type transistors M6 and M7, which are the substantially same except for the impurity concentrations of the gates, function as input transistors of a differential amplifier. The p-type transistors M4 and M5 form a current-mirror circuit. The voltage Vpn' is applied to the gate of n-type transistor M6 from the first reference voltage generating circuit. The gate of n-type transistor M7 is connected to the drain of p-type transistor M8, and accordingly, to the first reference voltage Vref extracted from the drain of transistor M8 as the output of the differential amplifier.

Based on the first reference voltage Vref, the second and third reference voltages Tvref and Svref are produced through the voltage-divider using resistors R4, R5, and R6. The second reference voltage Tvref is output from the junction point between resistors R4 and R5, and supplied to the comparison circuit. The third reference voltage Svref is output from the junction point between resistors R5 and R6, and supplied to the subtraction circuit.

The subtraction circuit includes operational amplifiers OP1 and OP2, and resistors R7, R8, R9, and R10. The output Svref' of the operational amplifier OP1 is connected to the inversion input of the operational amplifier OP1 itself, while the non-inversion input of the operational amplifier receives the third reference voltage Stref supplied from the second reference voltage generating circuit. The output Svref' of the operational amplifier OP1 is supplied via resistor R7 to the inversion input of the operational amplifier OP2. The output Tvptat of the operational amplifier OP2 itself is also connected via resistor R8 to the inversion input of the operational amplifier OP2. On the other hand, the non-inversion input of the operational amplifier OP2 receives Svptat from the first voltage generating circuit via resistor R9. The non-inversion input of the operational amplifier OP2 is also connected via resistor R10 to the ground voltage GND.

The comparison circuit comprises an operational amplifier OP3. The second reference voltage Tvref generated by the second reference voltage generating circuit is input to the inversion input of the operational amplifier OP3, while Tvptat supplied from the subtraction circuit is input to the non-inversion input of the operational amplifier OP3. The output Tout of the third operational amplifier OP3 is a final output of the temperature sensor.

FIGS. 16A through 16D illustrate the temperature characteristics of the output signals generated in the temperature sensor shown in FIG. 15, and the operations of the circuits shown in FIG. 15 will be explained based on these figures.

In the first voltage generating circuit, the n-type transistor M11 with the gate coupled to its source is used as a constant-current source, and n-type transistors M11 and M12 are connected in series. Since the same quantity of electric current flows through transistors M11 and M12 that have the same conductivity (n-type), but with different impurity concentrations of the gate, the potential difference between the source-gate voltage of n-type transistor M11 and the source-gate voltage of n-type transistor M12 becomes a PTAT voltage (Vptat) having a positive temperature coefficient, as disclosed in U.S. Pat. No. 6,437,550.

Since the gate of the n-type transistor M11 is coupled to its source, there is no potential difference between the gate and the source. Consequently, the source-gate voltage of the n-type transistor M12 becomes Vptat. Then, Svptat, which is the output of the first voltage generating circuit, becomes $$Svptat = Vptat*(R12+R13)/R13. \quad (12)$$

Figure 16A:
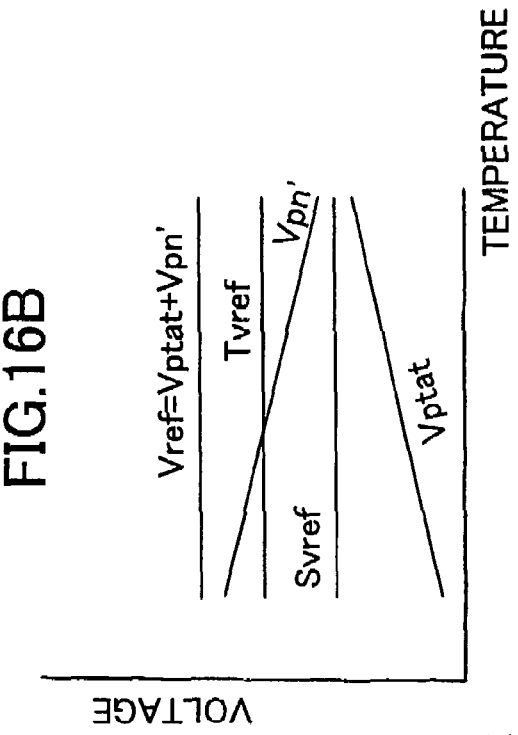
FIG. 16A through FIG. 16D are graphs showing the temperature characteristics of various signals generated in the circuit shown in FIG. 15.

FIG. 16A shows the temperature characteristics of voltages Vptat and Svptat. Vptat is amplified at the ratio defined by equation (12) so as to produce Svptat. Because Vptat has a positive temperature coefficient, Svptat also has a positive temperature coefficient. Svptat does not have to have such a large slope as Tvptat2 shown in FIG. 11.

Concerning the second voltage generating circuit, the n-type transistor M1 with its gate coupled to its source is used as a constant-current source, and two n-type transistors M1 and M2 are connected in series in the first reference voltage generating circuit. Since the same quantity of electric current flows through transistors M1 and M2 that have the same conductivity and different gate polarities, the potential difference between the source-gate voltage of transistor M1 and the source-gate voltage of transistor M2 becomes a voltage having a negative temperature coefficient, which is referred to as Vpn. Because the gate of transistor M1 is coupled to its source, there is no potential difference between the source and the gate of this transistor. Therefore, the source-gate voltage of transistor M2 becomes the Vpn voltage.

From this voltage Vpn, Vpn' is produced as the output of the first reference voltage generating circuit, by converting Vpn at a predetermined ratio defined by equation (12)

$$Vpn' = Vpn*R3/(R2+R3) \quad (13)$$

Since Vpn has a negative temperature coefficient, Vpn' also has a positive temperature coefficient.

In the second reference voltage generating circuit, p-type transistors M4 and M5 form a current mirror circuit, and n-type transistors M6 and M7 having difference gate impurity concentrations function as input transistors of the differential amplifier. Accordingly, the same quantity of electric current flows through the n-type transistors M6 and M7. In addition, because a feedback loop is formed by the differential amplifier (M6 and M7) and p-type transistor M8, an input offset Vptat having a positive temperature coefficient appears between the source-gate voltage of n-type transistor M6 and the source-gate voltage of n-type transistor M7, as described in U.S. Pat. No. 6,437,550.

When Vpn' is applied to the gate of transistor M6 from the first reference voltage generating circuit, the first reference voltage Vref, which is the sum of Vpn' and Vptat, is generated between the source and the gate of the n-type transistor M7. Since Vref is obtained by adding Vptat having a positive temperature coefficient to Vpn' obtained through voltage conversion at a predetermined ratio based on Vpn, the resultant Vref does not have a temperature coefficient. Based on the first reference voltage Vref, the second and third reference voltages Tvref and Svref are generated through the voltage divider using resistors R4, R5 and R6. The reference voltages Vref, Tvref, and Svref are expressed by equations (13), (9), and (10).

$$Vref=Vpn*R3/(R2+R3)+Vptat=Vpn'+Vpn \quad (14)$$

$$Tvref=Vref*(R5+R6)/(R4+R5+R6) \quad (9)$$

$$Svref=Vref*R6/(R4+R5+R6) \quad (10)$$

Figure 16B:
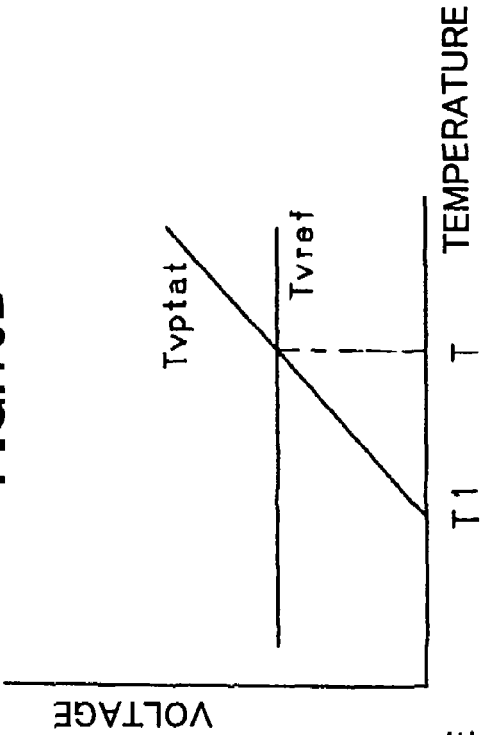

FIG. 16B exhibits the temperature characteristics of these reference voltages, as well as Vpn and Vptat. The first reference voltage Vref is generated by adding Vpn', which has a negative temperature coefficient and is supplied from the first reference voltage generating circuit, to Vptat, which has a positive temperature coefficient and is generated in the second reference voltage generating circuit. The second and third reference voltages Tvref and Svref are generated from Vref, through voltage conversion at predetermined ratios defined by equation (9) and (10), respectively. Consequently, both Tvref and Svref are constant without having a temperature coefficient.

Figure 16C:
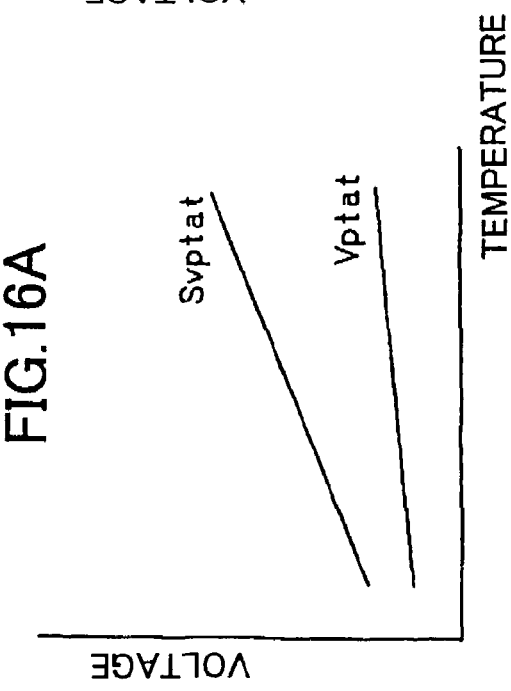

FIG. 16C shows the temperature characteristic of voltages treated in the subtraction circuit, which includes operational amplifiers OP1 and OP2, and resistors R7, R8, R9, and R10. Since the operational amplifier OP1 is used as a voltage follower, an output Svref', which has the same potential as the third reference voltage Svref supplied to the non-inversion input of OP1 is obtained from the operational amplifier OP1. The operational amplifier OP1 is inserted for the purpose of preventing an electric current path from being produced between Tvptat (output of the operational amplifier Op2) and the third reference voltage Svref via resistors R8, R7, and R6, because such an electric current path causes the reference voltages produced in the second voltage generating circuit to fluctuate.

The operational amplifier OP2 is used as a differential amplifier. By setting R7 equal to R9 (R7=R9) and setting R8 equal to R10 (R8=R10), the output Tvptat of the operational amplifier OP2 becomes $$Tvptat=(R8/R7)*(Svptat-Svref') \quad (11)$$

as is known in the art. When the temperature is lower than T1, Svref is greater than Svptat (Svptat<Svref), the subtraction result is treated as 0 volts. If the temperature is higher than T1, Svptat is greater than Svref (Svptat>Svref), and therefore, equation (11) applies. The subtraction result of (Svptat-Svref') of the right-hand side of equation (11) is illustrated as the dotted line A in FIG. 16C. This subtraction result is amplified by resistors R8 and R7 to obtain Tvptat. From equations (11) and (12), the ratio S of the temperature coefficient (or the slope) of Tvptat to that of Vptat is expressed as $$S=[(R12+R13)/R13]*R8/R7 \quad (15)$$

By simply adjusting the resistances R12, R13, R7 and R8, the ratio S defined by equation (14) can be easily made equal to the ratio (R1+R2+R5)/R5, which is the temperature coefficient of Tvptat obtained in the first embodiment. For instance, if the temperature coefficient of Tvptat generated in the first voltage generating circuit shown in FIG. 4 is fifty (50), the temperature coefficient ratio (R12+R13)/R13 defined in the first voltage generating circuit of the second embodiment is set to 10, and the temperature coefficient ratio R8/R7 defined in the subtraction circuit is set to 5. By so setting, the ratio S (that is, the temperature coefficient ratio of Tvptat) becomes fifty (50), as in the circuit disclosed in the first embodiment. This means that the first voltage generating circuit of the second embodiment does not have to produce Tvptat having a large slope (or the temperature coefficient ratio) by itself.

Figure 16D:
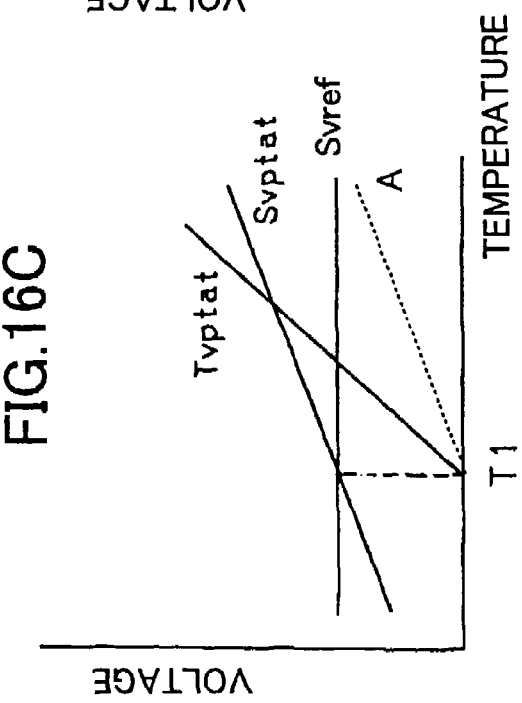

FIG. 16D shows the temperature characteristics of the voltages treated in the comparison circuit. The comparison circuit is comprised of operational amplifier OP3. The operational amplifier OP3 is used as a comparator. If the temperature is lower than T, Tvref is greater than Tvptat (Tvref>Tvptat). Because the voltage at the inversion input is higher than that of the non-inversion input, the output Tout of the comparator is Low. When the temperature is higher than T, then Tvref becomes smaller than Tvptat (Tvref<Tvptat). Since the voltage at the non-inversion input is greater than that of the non-inversion input, the output Tout of the comparator becomes High. The output Tout is used as a control signal for controlling the operation of a semiconductor integrated circuit so as to stop at a predetermined temperature T.

In the second embodiment, the first voltage generating circuit uses either a diode connection of NPN transistor or the principle of difference in gate work function to produce a PTAT voltage. However, the present invention is not limited to these examples, and any other suitable circuit configuration can be employed as the first voltage generating circuit, as long as a PTAT voltage is generated. Similarly, although, in the second embodiment, the second voltage generating circuit uses the principle of difference in gate work function to produce a reference voltage, any other suitable circuit, such as a band-gap reference circuit, may be used to as the second voltage generating circuit.

<Third Embodiment>

Figure 17:
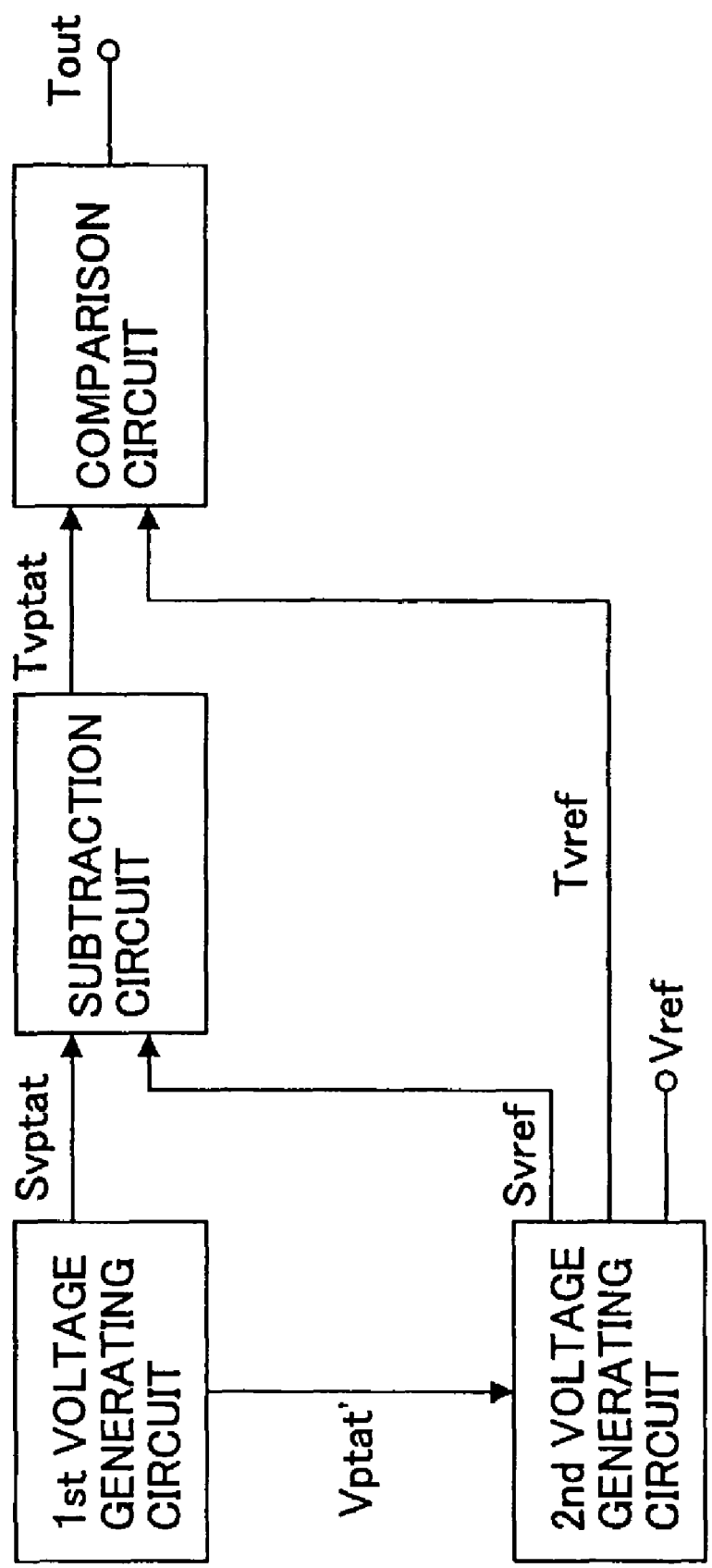
FIG. 17 is a block diagram of the temperature sensor according to the third embodiment of the invention.

FIG. 17 is a block diagram of the temperature sensor according to the third embodiment of the invention. The temperature sensor comprises a first voltage generating circuit, a second voltage generating circuit, a subtraction circuit, and a comparison circuit, as in the second embodiment. In the third embodiment, a voltage Vptat' is output from the first voltage generating circuit, and supplied to the second voltage generating circuit. This Vptat' is used in the second generating voltage circuit to produce a reference voltage.

The first voltage generating circuit also outputs Svptat, in adiition to Vptat'. The Svptat and Vptat' are produced from a PTAT voltage (not shown in FIG. 17) originally generated in the first voltage generating circuit in proportion to the absolute temperature, through voltage conversion at predetermined ratios using a voltage divider. In the second embodiment, the PTAT voltage, Svptat, and Vptat' have positive temperature coefficients.

The second voltage generating circuit generates a voltage having a negative temperature coefficient (not shown in FIG. 17), and adds this voltage to Vptat' supplied from the first voltage generating circuit to produce the first reference voltage Vref that does not have a temperature coefficient. The second voltage generating circuit also outputs the second reference voltage Tvref and the third reference voltage Svref, which are produced from Vref and do not have a temperature coefficient.

The subtraction circuit amplifies the difference between Svptat supplied from the first voltage generating circuit and the third reference voltage Svref supplied from the second voltage generating circuit, and produces a voltage Tvptat.

The comparison circuit compares the Tvptat with the second reference voltage Tvref, and outputs the comparison result Tout.

If the first voltage generating circuit is designed so as to produce a voltage with a negative temperature coefficient, then a voltage with a negative temperature coefficient is generated in the second voltage generating circuit to produce the reference voltages. Both the first and second voltage generating circuits make use of the principle of difference in gate work function.

Figure 18:
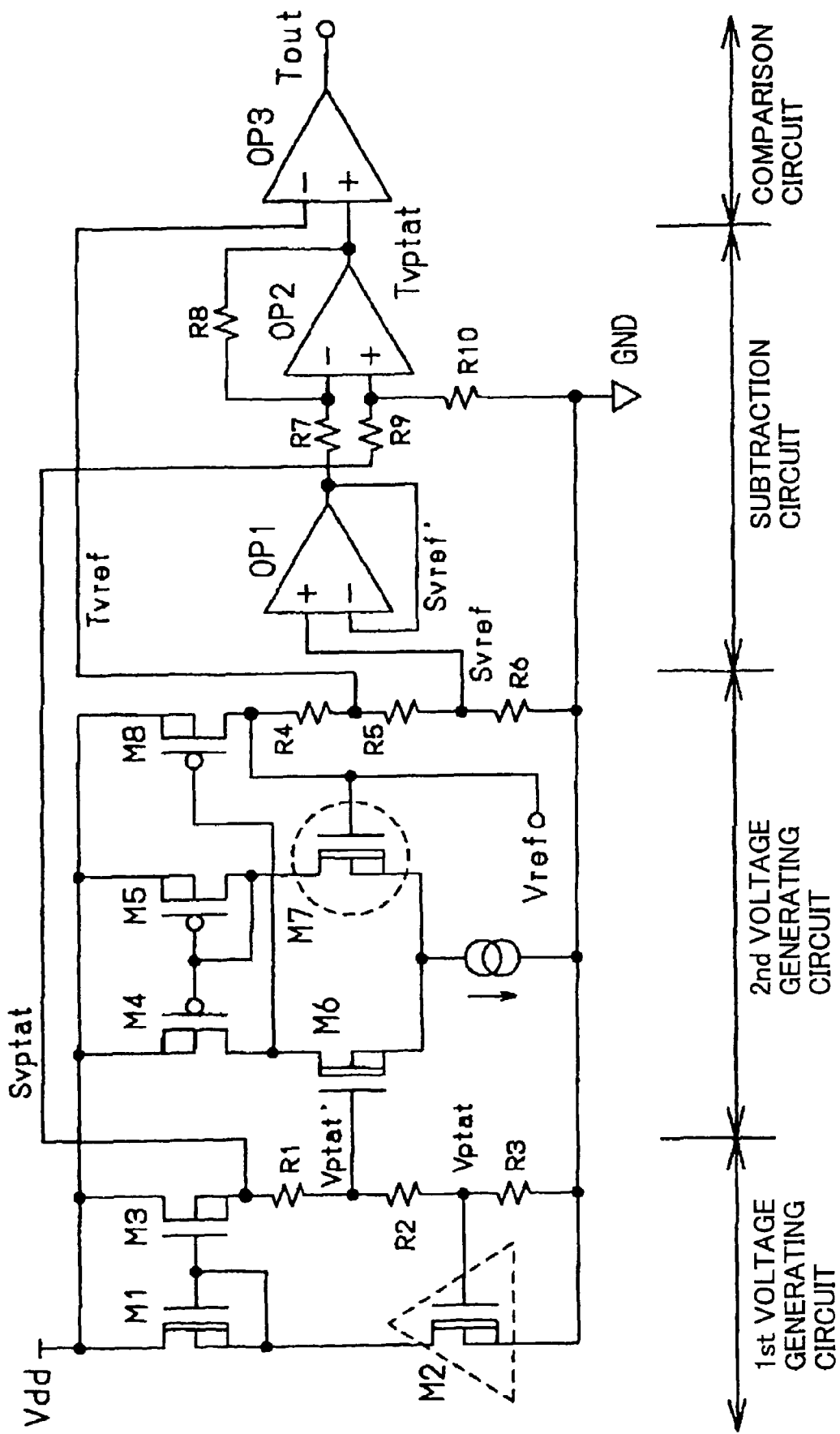
FIG. 18 is a circuit diagram of the temperature sensor shown in FIG. 17.

FIG. 18 is a circuit diagram of the temperature sensor shown in FIG. 17. This circuit is fabricated in an n-type substrate.

The first voltage generating circuit comprises n-type transistors M1, M2, and M3, and resistors R1, R2 and R3. Transistors M1 and M2 are formed in the p-type well of the n-type substrate, and have the same impurity concentration at the channel regions and the source/drain regions. The electric potential of the substrate of each transistor is equal to the source potential. The n-type transistor M1 has a highly-doped n-type gate, and n-type transistor M2 has a lightly-doped n-type gate. The ratios (W/L) of the channel width W to the channel length L of the transistors M1 and M2 are set equal to each other.

The transistors M1 and M2, which are substantially the same except for the impurity concentrations of the gates, are connected in series. The gate of transistor M1 is coupled to its source. Thus, the transistor M1 is used as a constant-current source. The gate potential of the n-type transistor M2 is given by the source follower formed by n-type transistor M3 and resistors R1, R2, and R3. While Vptat is extracted from the junction point between resistors R2 and R3, Vptat' is output from the junction point between resistors R1 and R2. Another voltage Svptat is output from the junction point between the source of transistor M3 and resistor R1.

The second voltage generating circuit comprises p-type transistors M4, M5, and M8, n-type transistors M6 and M7, and resistors R4, R5, and R6. The n-type transistors M6 and M7 are formed in the p-type well of the n-type substrate, and have the same impurity concentration of the substrate and the channel dope regions. The electric potential of the substrate of each transistor is equal to the source potential. The n-type transistor M6 has a highly-doped n-type gate, and n-type transistor M7 has a highly-doped p-type gate. The ratios (W/L) of the channel width W to the channel length L of the transistors M6 and M7 are set equal.

The n-type transistors M6 and M7, which are substantially the same except for the gate polarities, function as input transistors of a differential amplifier. The p-type transistors M4 and M5 form a current-mirror circuit. The voltage Vptat' output from the first voltage generating circuit is applied to the gate of n-type transistor M6. The gate of n-type transistor M7 is connected to the first reference voltage Vref, which is extracted from the drain of the p-type transistor M8 and is the output of the differential amplifier. The first reference Vref is divided by resistors R4, R5, and R6 to produce the second and third reference voltages. The second reference voltage Tvref is output from the junction point between resistors R4 and R5. The third reference voltage Svref is output from the junction point from resistors R5 and R6.

The subtraction circuit includes operational amplifiers OP1 and OP2, and resistors R7, R8, R9, and R10. The output Svref' of the operational amplifier OP1 is connected to the inversion input of the operational amplifier OP1 itself, while the non-inversion input of the operational amplifier receives the third reference voltage Stref supplied from the second voltage generating circuit. The output Svref' of the operational amplifier OP1 is supplied via resistor R7 to the inversion input of the operational amplifier OP2. The output Tvptat of the operational amplifier OP2 itself is also connected via resistor R8 to the inversion input of the operational amplifier OP2. On the other hand, the non-inversion input of the operational amplifier OP2 receives Svptat from the first voltage generating circuit via resistor R9. The non-inversion input of the operational amplifier OP2 is also connected via resistor R10 to the ground voltage GND.

The comparison circuit comprises an operational amplifier OP3. The second reference voltage Tvref is input from the second voltage generating circuit to the inversion input of the operational amplifier OP3, while Tvptat is input from the subtraction circuit to the non-inversion input of the operational amplifier OP3. The output Tout of the third operational amplifier OP3 is a final output of the temperature sensor.

FIGS. 19A through 19D illustrate the output characteristics of the temperature sensor shown in FIG. 18, and the operations of the circuits shown in FIG. 18 will be explained using these figures.

In the first voltage generating circuit, the n-type transistor M1 with the gate coupled to its source is used as a constant-current source, and n-type transistors M1 and M2 are connected in series. Since the same quantity of electric current flows through transistors M1 and M2 that have the same conductivity (n-type), but with different impurity concentrations of the gates, the potential difference between the source-gate voltage of n-type transistor M1 and the source-gate voltage of n-type transistor M2 becomes a PTAT voltage (Vptat) having a positive temperature coefficient, as disclosed in U.S. Pat. No. 6,437,550.

Because the gate of the n-type transistor M1 is coupled its source, there is no potential difference between the gate and the source. Consequently, the source-gate voltage of the n-type transistor M2 becomes Vptat. Then, the outputs Vptat' and Svptat of the first voltage generating circuit become $$Vptat'=Vptat*(R2+R3)/R3 \qquad (7)$$

$$Svptat=Vptat*(R1+R2+R3)/R3 \qquad (16)$$

Figure 19A:
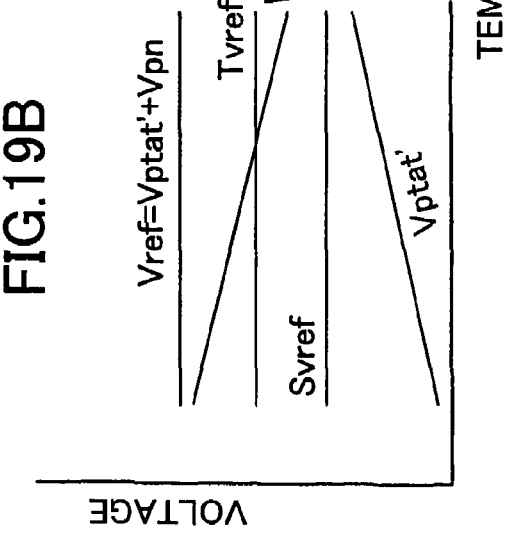
FIG. 19A through 19D are graphs showing the temperature characteristics of various signals generated in the circuit shown in FIG. 18.

FIG. 19A shows the temperature characteristics of these voltages. Vptat' and Svptat are produced by amplifying Vptat at predetermined ratios defined in equations (7) and (16). Because Vptat has a positive temperature coefficient, Vptat' and Svptat also have positive temperature coefficients. This Svptat does not have to have such a large slope as Tvptat2 shown in FIG. 11.

Concerning the second voltage generating circuit, p-type transistors M4 and M5 form a current mirror circuit, and n-type transistors M6 and M7 having difference gate polarities function as input transistors of the differential amplifier. Accordingly, the same quantity of electric current flows through the n-type transistors M6 and M7. In addition, because a feedback loop is formed by the differential amplifier (M6 and M7) and p-type transistor M8, an input offset Vpn having a negative temperature coefficient appears between the source-gate voltage of n-type transistor M6 and the source-gate voltage of n-type transistor M7.

When Vptat' is applied to the gate of the n-type transistor M6 from the first voltage generating circuit, the first reference voltage Vref, which is the sum of Vpn and Vptat', appears between the source and the gate of the n-type transistor M7. Since Vref is obtained by adding Vpn having a negative temperature coefficient to Vptat' having a positive temperature coefficient, which is obtained from Vptat through voltage conversion at a predetermined ratio, the resultant Vref does not have a temperature coefficient. Based on the first reference voltage Vref, the second and third reference voltages Tvref and Sverf are generated through the voltage divider using resistors R4, R5 and R6. The reference voltages Vref, Tvref, and Svref are expressed by equations (8), (9), and (10).

$$Vref = Vptat^* (R2+R3)/R3 + Vpn = Vptat' + Vpn \quad (8)$$

$$Tvref = Vref^* (R5+R6)/(R4+R5+R6) \quad (9)$$

$$Svref = Vref^* R6/(R4+R5+R6) \quad (10)$$

Figure 19B:
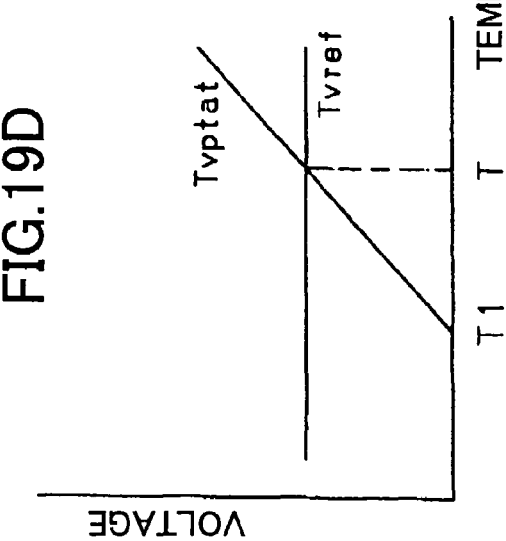

FIG. 19B exhibits the temperature characteristics of these reference voltages. As shown in the graph, the first reference voltage Vref is generated by adding Vptat', which has a positive temperature coefficient and is supplied from the first voltage generating circuit, to Vpn, which has a negative temperature coefficient and is generated in the second voltage generating circuit. The second and third reference voltages Tvref and Svref are generated by converting Vref at predetermined ratios defined by equation (9) and (10), respectively. Consequently, both Tvref and Svref are constant without having a temperature coefficient.

Figure 19C:
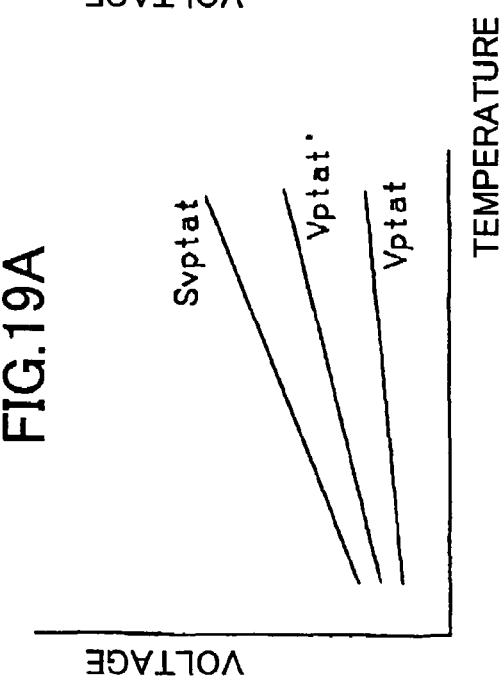

FIG. 19C shows the temperature characteristics of voltages produced in the subtraction circuit, which includes operational amplifiers OP1 and OP2, and resistors R7, R8, R9, and R10. Since the operational amplifier OP1 is used as a voltage follower, an Svref', which has the same potential as the third reference voltage Svref input to the non-inversion input of OP1, is obtained from the operational amplifier OP1. The operational amplifier OP1 is inserted for the purpose of preventing an electric current path from being produced between Tvptat (output of the operational amplifier Op2) and the third reference voltage Svref via resistors R8, R7, and R6, because such an electric current path causes the reference voltages produced in the second voltage generating circuit to fluctuate.

The operational amplifier OP2 is used as a differential amplifier. By setting R7 equal to R9 (R7=R9) and setting R8 equal to R10 (R8=R10), the output Tvptat of the operational amplifier OP2 becomes $$Tvptat = (R8/R7)^* (Svptat - Svref') \quad (11)$$

as is known in the art. When the temperature is lower than T1, Svptat is smaller than Svref (Svptat<Svref), and in this case, the output Tvptat of the subtraction circuit is 0 volts. If the temperature is higher than T1, Svptat>Svref stands, and a voltage defined by equation (11) is output. From equations (11) and (16), the ratio S of the temperature coefficient (or the slope) of Tvptat to that of Vptat is expressed as $$S = [(R1+R2+R3)/R3]^* R8/R7. \quad (17)$$

By simply adjusting the resistances R1 through R3, and R7 and R8, the ratio S defined by equation (17) can be easily made equal to the ratio (R1+R2+R5)/R5, which is the temperature coefficient of Tvptat obtained in the first embodiment.

For instance, if the temperature coefficient of Tvptat generated in the first voltage generating circuit shown in FIG. 4 is fifty (50), the temperature coefficient ratio (R1+R2+R3)/R3] defined in the first voltage generating circuit of the third embodiment is set to 10, and the temperature coefficient ratio R8/R7 defined in the subtraction circuit is set to 5. By so setting, the ratio S (that is, the temperature coefficient ratio of Tvptat) becomes fifty (50), as in the circuit disclosed in the first embodiment. This means that it is unnecessary for the first voltage generating circuit of the third embodiment to produce Tvptat having a large slope (or the temperature coefficient ratio) by itself.

Figure 19D:
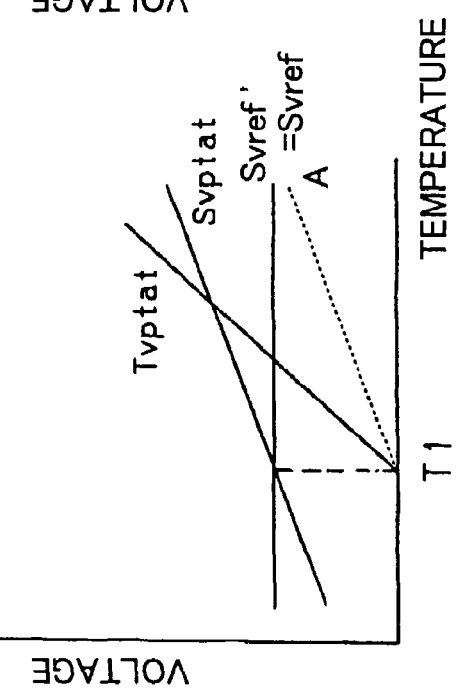

FIG. 19D shows the temperature characteristics of the signals treated in the comparison circuit. The comparison circuit is comprised of operational amplifier OP3. The operational amplifier OP3 is used as a comparator. If the temperature is lower than T, Tvref>Tvptat stands. Because the voltage at the inversion input is higher than that of the non-inversion input, the output Tout of the comparator is Low. When the temperature is higher than T, then Tvref<Tvptat stands. Since the voltage at the non-inversion input is greater than that of the inversion input, the output Tout of the comparator becomes High. By using the output Tout as a control signal for a semiconductor integrated circuit, the operation of the semiconductor integrated circuit can be correctly stopped at a predetermined temperature T, while allowing the temperature sensor to operate at a low voltage.

Figure 20:
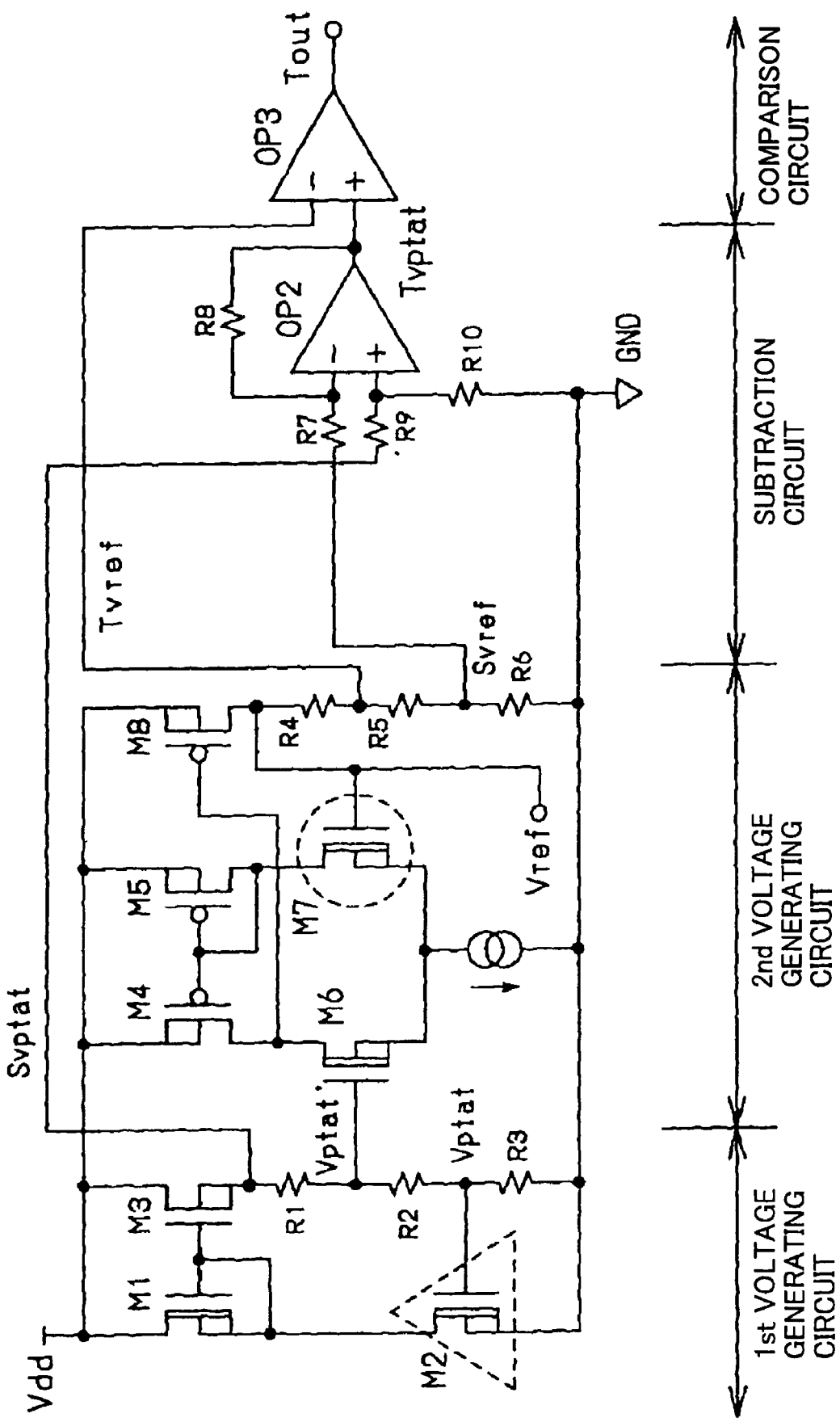
FIG. 20 is a circuit diagram of a modification of the temperature sensor shown in FIG. 18.

FIG. 20 is a circuit diagram of a modification of the temperature sensor according to the third embodiment of the invention. This circuit is fabricated in an n-type substrate.

The first voltage generating circuit comprises n-type transistors M1, M2, and M3, and resistors R1, R2 and R3. Transistors M1 and M2 are formed in the p-type well of the n-type substrate, and have the same impurity concentration at the channel regions and the source/drain regions. The electric potential of the substrate of each transistor is equal to the source potential. The n-type transistor M1 has a highly-doped n-type gate, and n-type transistor M2 has a lightly-doped n-type gate. The ratios (W/L) of the channel width W to the channel length L of the transistors M1 and M2 are set equal to each other.

The transistors M1 and M2, which are substantially the same except for the impurity concentrations of the gates, are connected in series. The gate of transistor M1 is coupled to its source. Thus, the transistor M1 is used as a constant-current source. The gate potential of the n-type transistor M2 is given by the source follower formed by n-type transistor M3 and resistors R1, R2, and R3. While Vptat is extracted from the junction point between resistors R2 and R3, Vptat' is output from the junction point between resistors R1 and R2. Another voltage Svptat is output from the junction point between the source of transistor M3 and resistor R1.

The second voltage generating circuit comprises p-type transistors M4, M5, and M8, n-type transistors M6 and M7, and resistors R4, R5, and R6. The n-type transistors M6 and M7 are formed in the p-type well of the n-type substrate, and have the same impurity concentration of the substrate and the channel dope regions. The electric potential of the substrate of each transistor is equal to the source potential. The n-type transistor M6 has a highly-doped n-type gate, and n-type transistor M7 has a highly-doped p-type gate. The ratios (W/L) of the channel width W to the channel length L of the transistors M6 and M7 are set equal to each other.

The n-type transistors M6 and M7, which are substantially the same except for the gate polarities, function as input transistors of a differential amplifier. The p-type transistors M4 and M5 form a current-mirror circuit. The voltage Vptat' output from the first voltage generating circuit is applied to the gate of n-type transistor M6. The gate of n-type transistor M7 is connected to the first reference voltage Vref, which is extracted from the drain of the p-type transistor M8 and is the output of the differential amplifier. The first reference Vref is divided by resistors R4, R5, and R6 to produce the second and third reference voltages. The second reference voltage Tvref is output from the junction point between resistors R4 and R5. The third reference voltage Svref is output from the junction point from resistors R5 and R6.

The subtraction circuit includes operational amplifier OP2, and resistors R7, R8, R9, and R10. The third reference voltage Svref is connected via resistor R7 to the inversion input of the operational amplifier OP2. The inversion input of the operational amplifier OP2 also receives a voltage Tvpatat, which is the output of the operational amplifier OP2 itself, via resistor R8. On the other hand, the non-inversion input of the operational amplifier OP2 receives Svptat from the first voltage generating circuit via resistor R9. The non-inversion input of the operational amplifier OP2 is also connected via resistor R10 to the ground voltage GND.

The comparison circuit comprises an operational amplifier OP3. The second reference voltage Tvref is input from the second voltage generating circuit to the inversion input of the operational amplifier OP3, while Tvptat is input from the subtraction circuit to the non-inversion input of the operational amplifier OP3. The output Tout of the third operational amplifier OP3 is a final output of the temperature sensor.

In operation, since the first voltage generating circuit of this modification is the same as that used in the circuit shown in FIG. 18, a voltage Vptat having a positive temperature coefficient, which corresponds to the source-gate voltage of n-type transistor M2, is output. The outputs Vptat' and Svptat of the first voltage generating circuit are produced through voltage conversion using resistors R1, R2, and R3, as defined in equations (7) and (16).

$$Vptat'=Vptat*(R2+R3)/R3 \quad (7)$$

$$Svptat=Vptat*(R1+R2+R3)/R3. \quad (16)$$

These voltages generated in the first voltage generating circuit have positive temperature coefficients as illustrated in FIG. 19A.

The second voltage generating circuit of this modification is also the same as that used in the circuit shown in FIG. 18. Accordingly, there is an input offset Vpn having a negative temperature coefficient between the source-gate voltage of n-type transistor M6 and the source-gate voltage of n-type transistor M7. Since Vptat' is applied to the gate of the n-type transistor M6 from the first voltage generating circuit, the first reference voltage Vref, which is the sum of Vpn and Vptat' as expressed by equation (8), appears between the source and the gate of the n-type transistor M7. The second and third reference voltages Tvref and Sverf are produced from the first reference voltage Vref through the voltage divider using resistors R4, R5 and R6, as expressed by equations (9) and (10).

$$Tvref=Vref*(R5+R6)/(R4+R5+R6) \quad (9)$$

$$Svref=Vref*R6/(R4+R5+R6) \quad (10)$$

The temperature characteristics of these reference voltages produced in the second voltage generating circuit are illustrated in FIG. 19B.

The subtraction circuit of this modification is comprised of operational amplifier OP2, and resistors R7, R8, R9, and R10. The operational amplifier OP2 is used as a differential amplifier. By setting R7 equal to R9 (R7=R9) and setting R8 equal to R10 (R8=R10), the output Tvptat of the operational amplifier OP2 becomes $$Tvptat=(R8/R7)*(Svptat-Svref) \quad (11)$$

as is known in the art. When the temperature is lower than T1, Svptat<Svref stantds, Tvptat becomes 0 volts. If the temperature is higher than T1, Svptat<Svref stands, and a voltage defined by equation (11) is output. From equations (11) and (16), the ratio S of the temperature coefficient (or the slope) of Tvptat to that of Vptat is expressed as $$S=[(R1+R2+R3)/R3]*R8/R7. \quad (17)$$

By simply adjusting the resistances R1 through R3, and R7 and R8, the ratio S defined by equation (17) can be easily made equal to the ratio (R1+R2+R5)/R5, which is the temperature coefficient of Tvptat obtained in the first embodiment.

For instance, if the temperature coefficient of Tvptat generated in the first voltage generating circuit shown in FIG. 4 is fifty (50), the temperature coefficient ratio (R1+R2+R3)/R3] defined in the first voltage generating circuit of this modification is set to 10, and the temperature coefficient ratio R8/R7 defined in the subtraction circuit is set to 5. By so setting, the ratio S (that is, the temperature coefficient ratio of Tvptat) becomes fifty (50), as in the circuit disclosed in the first embodiment. This means that it is unnecessary for the first voltage generating circuit of the third embodiment to produce Tvptat having a large slope (or the temperature coefficient ratio) by itself.

Unlike the circuit shown in FIG. 18, operational amplifier OP1 is not inserted before the operational amplifier OP2. Accordingly, an electric current path may be created between Tvptat and the third reference voltage Svref via resistors R8, R7, and R6. To reduce the influence of the electric current path, the resistance values of resistors T7 through R10 are set sufficiently larger than that of resistor R6.

The comparison circuit is comprised of operational amplifier OP3. The operational amplifier OP3 is used as a comparator. If the temperature is lower than T, Tvref>Tvptat stands. Because the voltage at the inversion input is higher than that of the non-inversion input, the output Tout of the comparator is Low. When the temperature is higher than T, then Tvref<Tvptat stands. Since the voltage at the non-inversion input is greater than that of the inversion input, the output Tout of the comparator becomes High. By using the output Tout as a control signal for a semiconductor integrated circuit, the operation of the semiconductor integrated circuit can be correctly stopped at a predetermined temperature T, while allowing the temperature sensor to operate at a low voltage.

Figure 21:
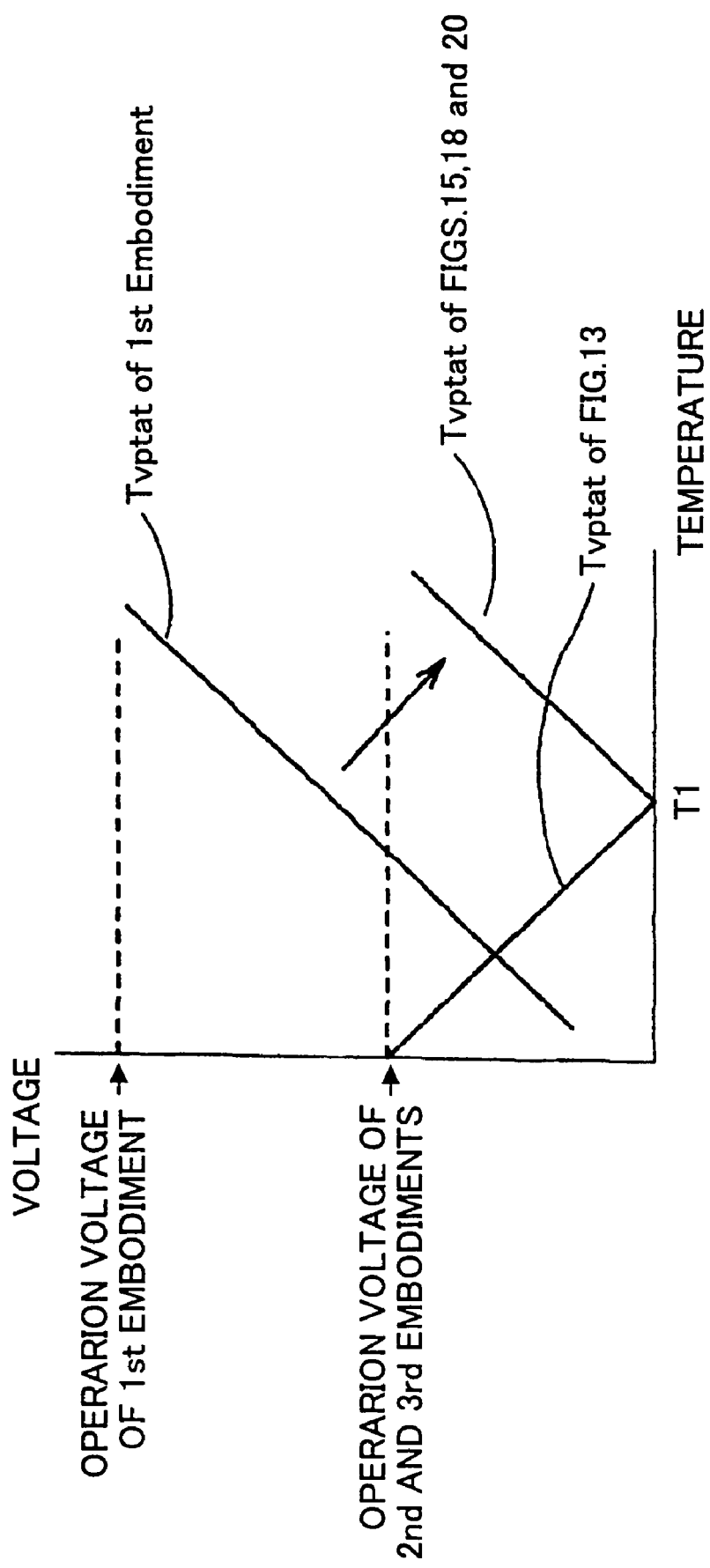
FIG. 21 is a graph showing the operation characteristics of the circuits of the first through third embodiments.

FIG. 21 is a graph showing the temperature characteristics of Tvptat used in the first, second, and third embodiments. In the first embodiment, the temperature coefficient of Tvptat is converted to a greater value in the first voltage generating circuit in order to improve the sensitivity of the temperature sensor, as illustrated in FIG. 11. The arrangement of the first embodiment causes Tvptat to become high as the temperature rises, which may adversely affect the operating voltage of the circuit.

In contrast, in the second and third embodiment, the conversion ratio of the first voltage generating circuit is not so large, as compared with the circuit of the first embodiment. The first voltage generating circuit outputs Svptat produced at a smaller conversion (amplification) ratio. The subtraction circuit amplifies the difference between Svptat and the third reference voltage Svref to produce Tvptat. When Tvptat has a positive temperature coefficient, Tvptat can shift lower with the temperature coefficient, as indicated by the arrow in FIG. 21. Consequently, the operation voltage of the temperatures sensor can be reduced. If Tvptat has a negative temperature coefficient, the output voltage is also reduced with an opposite sign of temperature coefficient.

<Fourth Embodiment>

Figure 22:
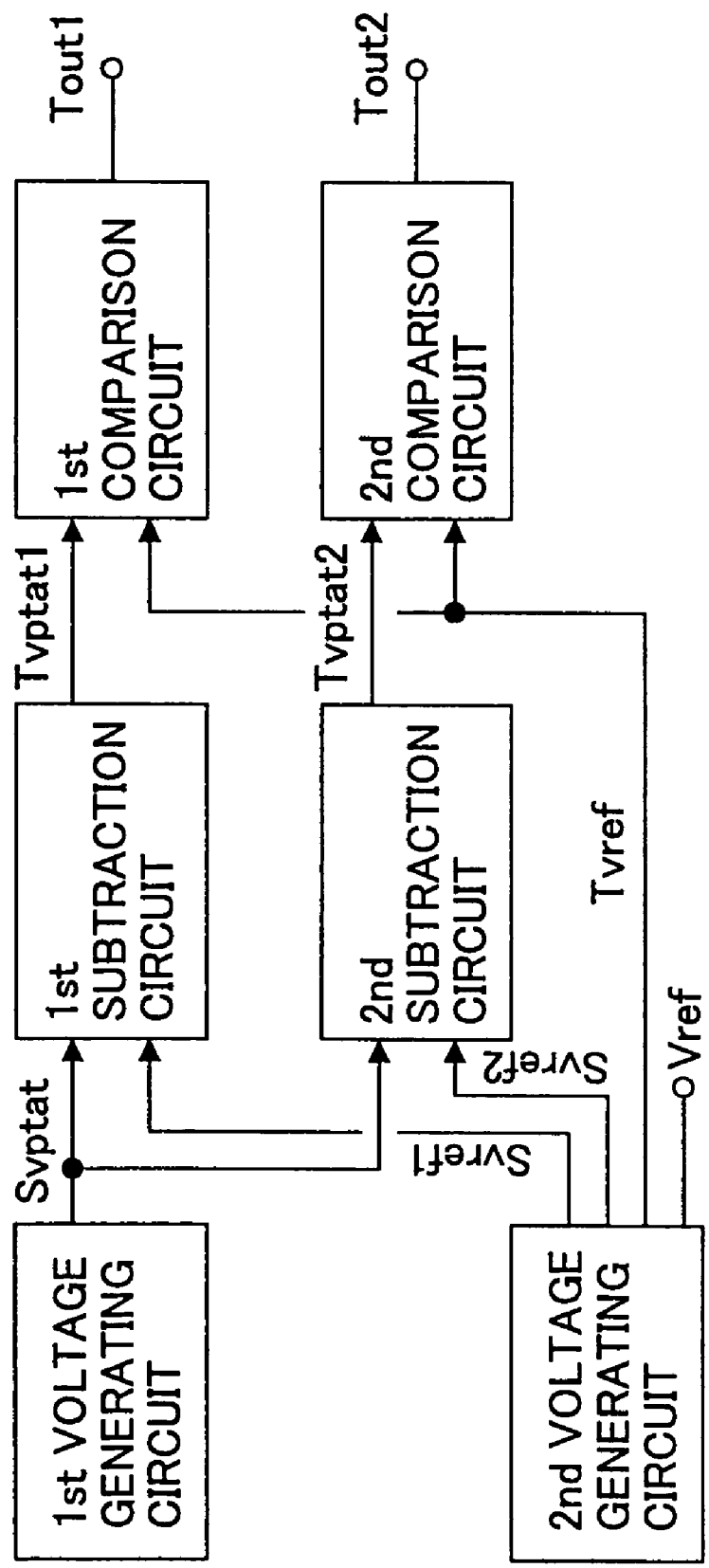
FIG. 22 is a block diagram of the temperature sensor according to the fourth embodiment of the invention.

FIG. 22 is a block diagram of the temperature sensor according to the fourth embodiment of the invention. The temperature sensor has two sets of subtraction circuits and comparison circuits. Two reference voltages Svref1 and Svref2 are supplied from the second voltage generating circuit to the first and second subtraction circuits, respectively. Accordingly, two comparison results Tout1 and Tout2 are output at different temperatures.

Figure 23:
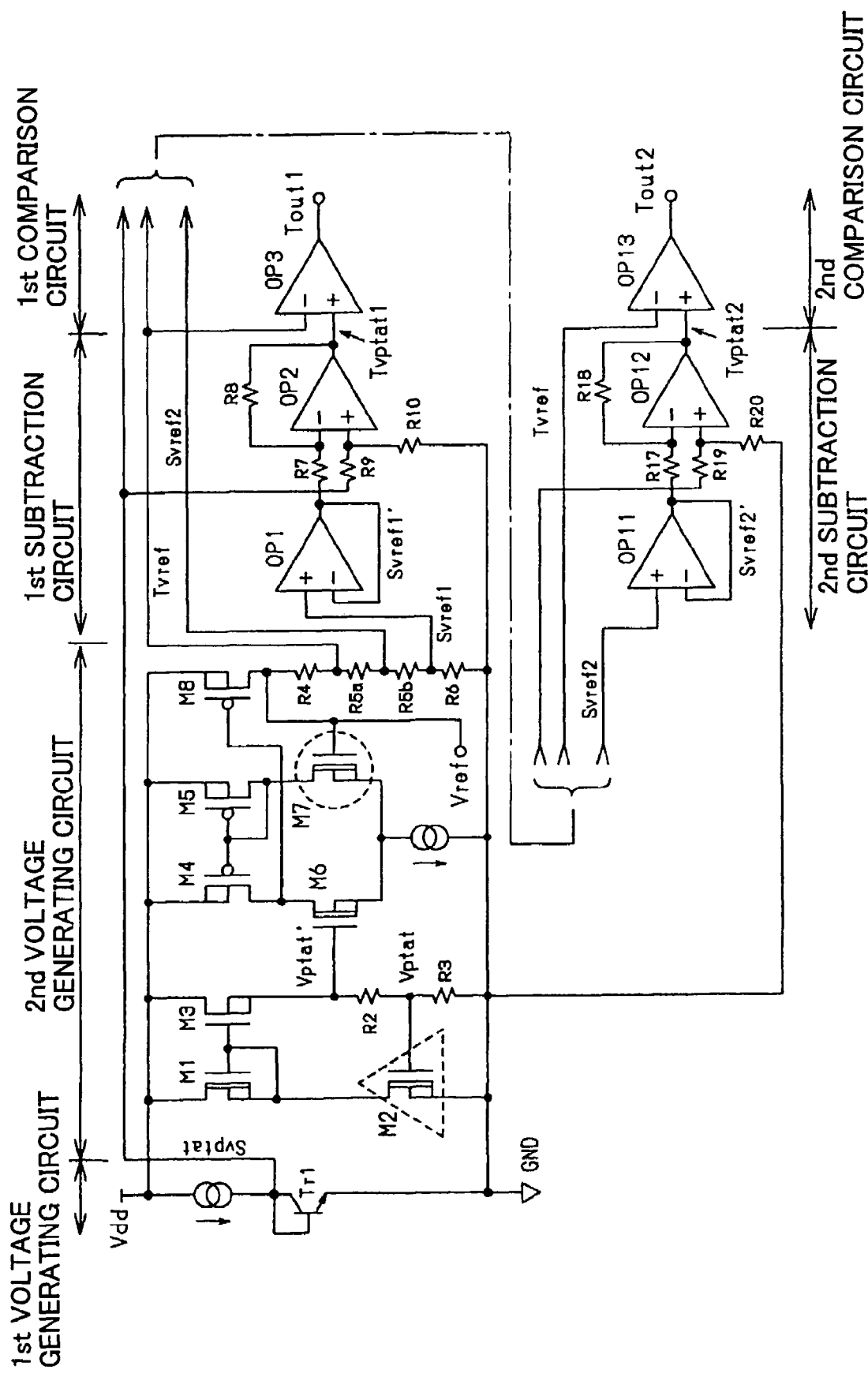
FIG. 23 is a circuit diagram of the temperature sensor shown in FIG. 22.

FIG. 23 is a circuit diagram of the temperature sensor shown in FIG. 22. The basic structure of the circuit shown in FIG. 23 is similar to the circuit shown in FIG. 13 of the second embodiment. The circuit shown in FIG. 23 has the first subtraction circuit and the first comparison circuit, which correspond to the subtraction circuit and the comparison circuit shown in FIG. 13. The circuit of FIG. 23 also has a second subtraction circuit and a second comparison circuit. The resistor R5 used in the second voltage generating circuit shown in FIG. 13 is divided into resistors R5a and R5b in the fourth embodiment. The reference voltage Svref1 is output from the junction point between resistors R6 and R5b. The counterpart reference voltage Svref2 is output from the junction point between resistors R5a and R5b. The reference voltage Svref1 is supplied to the operational amplifier OP1 of the first subtraction circuit, and the reference voltage Svref2 is supplied to the operational amplifier OP11 of the second subtraction circuit.

FIG. 24A through FIG. 24E illustrate the temperature characteristics of the output voltages used in the temperature sensor of the fourth embodiment. The operation of the circuit shown in FIG. 23 will be explained with reference to FIG. 24A through FIG. 24E.

Figure 24A:
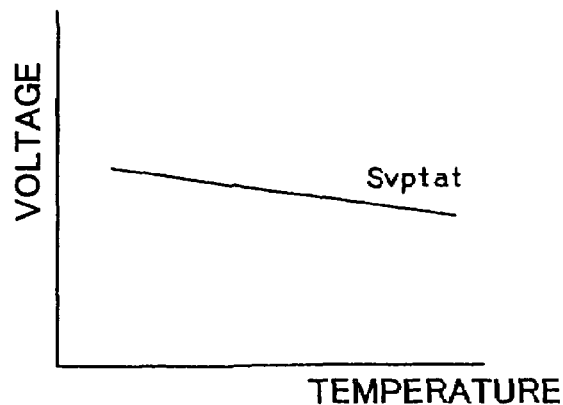
FIG. 24A through FIG. 24E are graphs showing the temperature characteristics of various signals generated in the circuit shown in FIG. 23.

The first voltage generating circuit uses a diode connection of the NPN transistor, as in the circuit shown in FIG. 13 (of the second embodiment). Accordingly, it outputs Svptat that is a PTAT voltage having a negative temperature coefficient, as illustrated in FIG. 24A.

The second voltage generating circuit is similar to that shown in FIG. 13. Accordingly, when Vptat' is applied to the gate of n-type transistor M6 from the junction point between the source of transistor M3 and resistor R2, a voltage Vref that results from adding Vpn to Vptat' is generated between the source and the gate of the n-type transistor M7. Since Vref is the sum of Vpn having a negative temperature coefficient and Vptat' having a positive temperature coefficient, which is obtained from Vptat through voltage conversion at a predetermined ratio, the resultant Vref (the first reference voltage) does not have a temperature coefficient. Based on the first reference voltage Vref, the second reference voltage Tvref and two types of third reference voltages Svref1 and Svref2 are generated through the voltage conversion using resistors R4, R5a, R5b, and R6. The reference voltages Vref, Tvref, Svref1, and Svref are expressed by equations (8), (9), (10)' and (10)".

$$Vref = Vptat^*(R2+R3)/R3 + Vpn = Vptat' + Vpn \quad (8)$$

$$Tvref = Vref^*(R5+R6)/(R4+R5+R6) \quad (9)$$

$$Svref1 = Vref^*R6/(R4+R5a+R5b+R6) \quad (10)'$$

$$Svref2 = Vref^*(R5b+R6)/(R4+R5a+R5b+R6) \quad (10)''$$

Figure 24B:
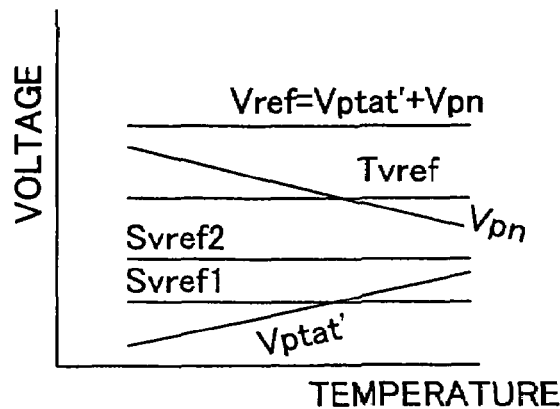

FIG. 24B illustrates the temperature characteristics of these signals.

The operation of the first subtraction circuit is the same as the subtraction circuit shown in FIG. 13, but for that Svref1 is used in place of Sverf. Accordingly, the output Tvptat1 of the operational amplifier OP2 becomes $$Tvptat1 = (R8/R7)^*(Svptat - Svref1') \quad (11)'$$

Figure 24C:
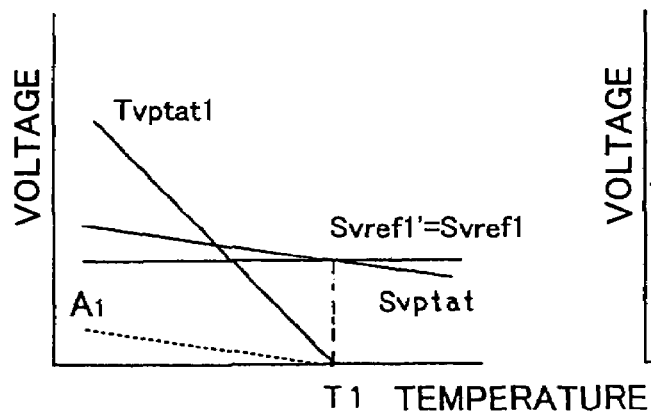

The temperature characteristics of these signals are shown in FIG. 24C. The dotted line A1 indicates the subtraction result of (Svptat−Svref1').

When the temperature is lower than T1, Svptat>Svref1 stands, and therefore, equation (11)' applies. If the temperature is higher than T1, Svptat<Svref1 stands, and the subtraction result is treated as 0 volts. Consequently, even if the ratio R8 to R7 (R8/R7) is increased, which means, even if the slope or the temperature coefficient of Tvptat1 is increased, for the purpose of improving the sensitivity to realize a highly precise temperature sensor, low-voltage operation is guaranteed because the Tvptat1 is reduced by a voltage corresponding to Svref1' that equals the third reference voltage Svref1.

The same applies to the second subtraction circuit. The output Tvptat2 of the operational amplifier OP12 becomes $$Tvptat2 = (R18/R17)^*(Svptat - Svref2'). \quad (11)''$$

Figure 24D:
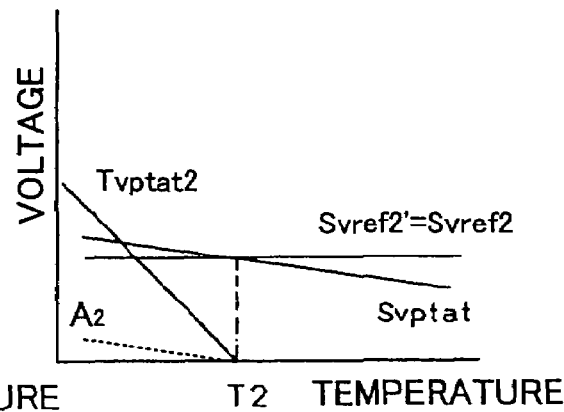

The temperature characteristics of these signals are shown in FIG. 24D. The dotted line A2 indicates the subtraction result of (Svptat−Svref2').

In the first comparison circuit, if the temperature is lower than T1, Tvref<Tvptat1 stands, and output Tout1 of the comparator (operational amplifier OP3) becomes High. If the temperature is higher than T1, Tvref>Tvptat1 stands, and therefore, the output Tout 1 becomes Low.

In the second comparison circuit, if the temperature is lower than T2, Tvref<Tvptat2 stands, and output Tout2 of the comparator (operational amplifier OP13) becomes High. If the temperature is higher than T2, Tvref>Tvptat2 stands, and therefore the Tout2 becomes Low. The temperature characteristics of these signals are shown in FIG. 24E.

Figure 24E:
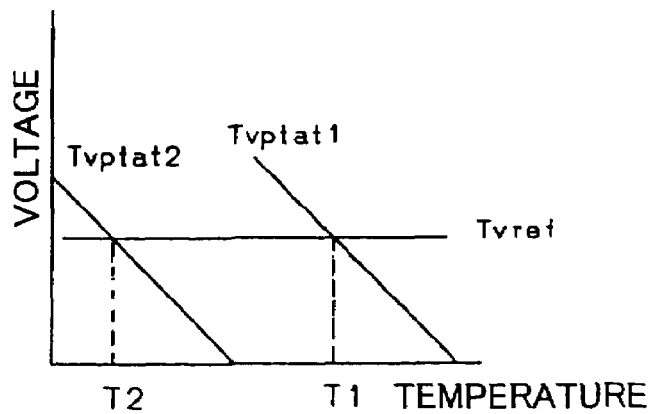

By using these outputs Tout1 and Tout 2 as control signals for a semiconductor integrated circuit, the operation of the semiconductor integrated circuit can be controlled at two different temperatures T1 and T2, as illustrated in FIG. 24E.

Three or more sets of subtraction circuits and comparison circuits may be used to produce three or more control signals.

Meanwhile, since using two sets of subtraction circuits and comparison circuits increases the load on the circuit, a switching device may be inserted between the second voltage generating circuit and the subtraction circuit. In this case, Svref1 and Svref2 generated in the second voltage generating circuit are switched and supplied alternately to a single subtraction circuit. Then, a single comparison circuit outputs Tout1 and Tout2 alternately, at the respective temperatures. This arrangement is efficient because the semiconductor integrated circuit can be controlled at two different temperatures with a single subtraction circuit.

Figure 28:
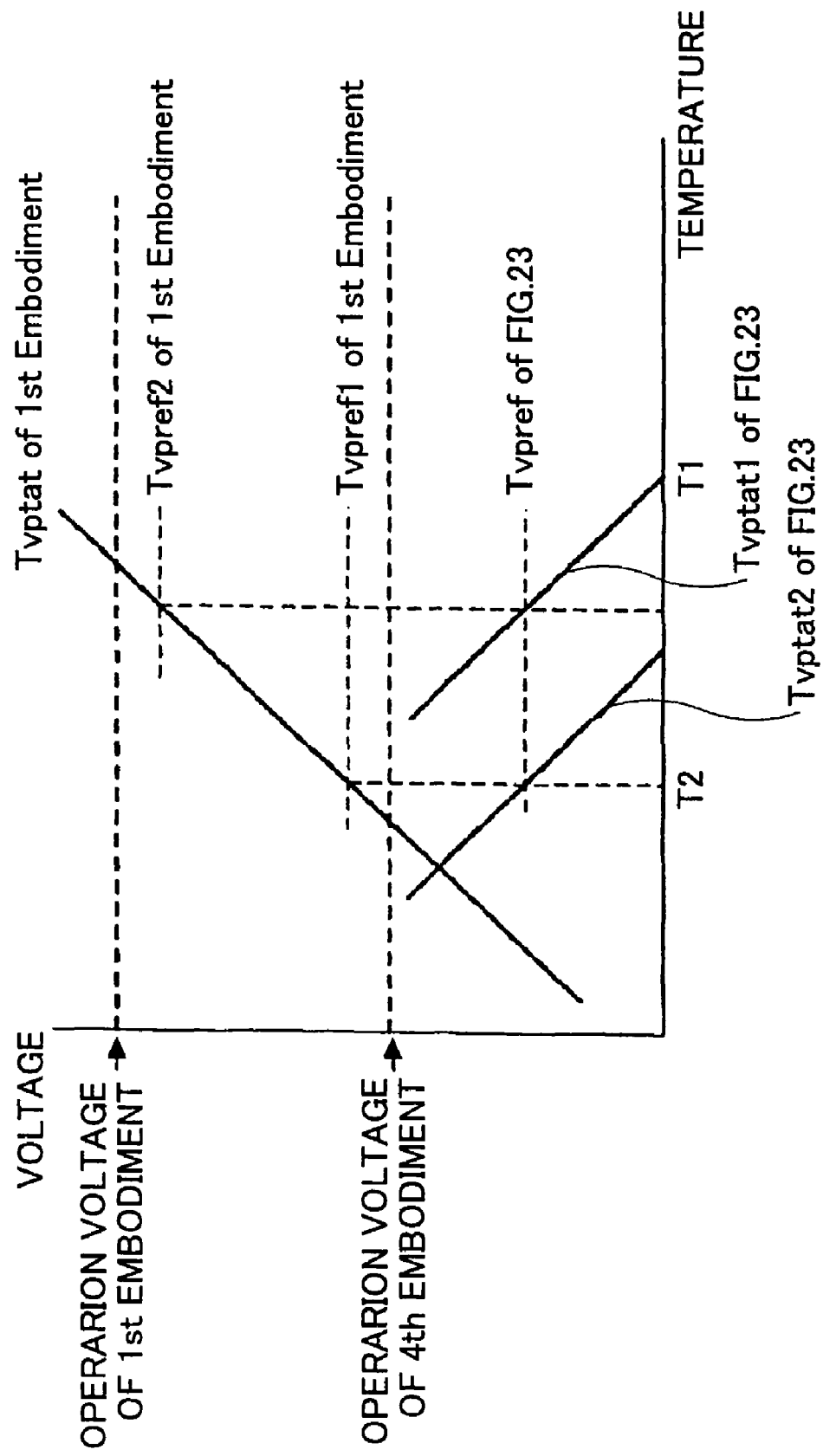
FIG. 28 is a graph showing the operation characteristics of the temperature sensor of the fourth embodiment, in comparison with that of the first embodiment.

FIG. 28 illustrates the temperatures characteristics of Tptat1 and Tptat 2 generated in the fourth embodiment, as comparison with Tptat generated in the first embodiment. In order to improve the sensitivity of the temperature sensor of the first embodiment, the temperature coefficient of Tvptat is converted to a greater value in the first voltage generating circuit, as illustrated in FIG. 11. This arrangement causes Tvptat to become high as the temperature rises, which may adversely affect the operating voltage of the circuit.

In contrast, in the fourth embodiment, Svptat generated by the first voltage generating circuit is reduced to lower levels in two different temperatures ranges by subtracting Svref1 and Svref2 by the first and second subtraction circuits, respectively. The subtraction results are amplified to produce Tvpat1 and Tvpat2. These voltages Tvptat1 and Tvptat2 are smaller than Tvptat of the first embodiment by quantities of Svref1 and Sverf2, with temperature coefficients (or slopes) opposite to Tvptat. Consequently, the operating voltage of the entire temperature sensor can be reduced.

<Fifth Embodiment>

Figure 25:
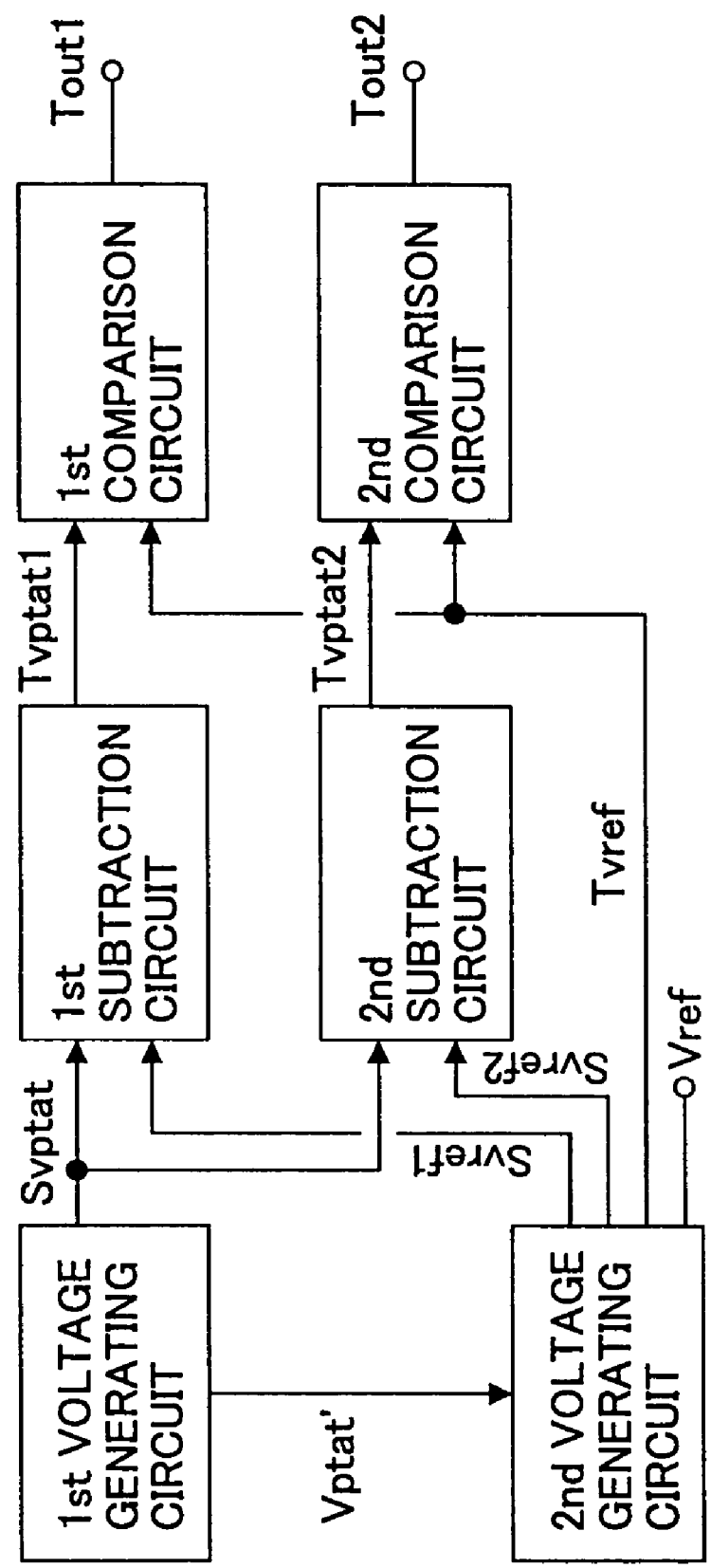
FIG. 25 is a block diagram of the temperature sensor according to the fifth embodiment of the invention.

FIG. 25 is a block diagram of the temperature sensor according to the fifth embodiment of the invention. This temperature sensor is a combination of the third and fourth embodiments. Namely, the output Vptat' having a positive temperature coefficient is supplied to the second voltage generating circuit, which then generates two types of third reference signals Svref1 and Svref2. The signals Svref1 and Svref2 are supplied to the first and second subtraction circuits, respectively. The first and second comparison circuits output Tout1 and Tout2, respectively, at different temperatures.

Figure 26:
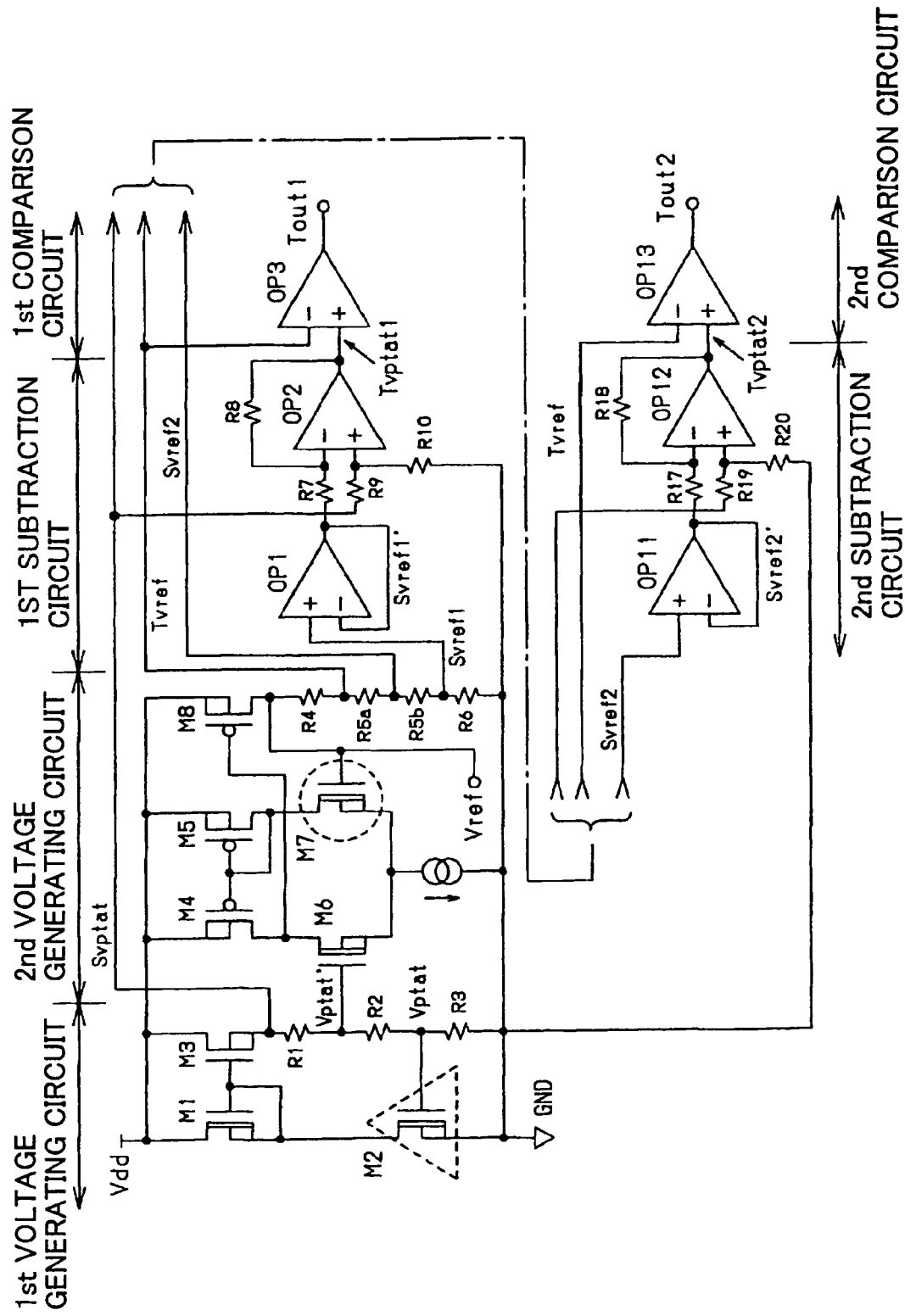
FIG. 26 is a circuit diagram of the temperature sensor shown in FIG. 25.

FIG. 26 is a circuit diagram of the temperature sensor shown in FIG. 25. The first and second voltage generating circuits of the fifth embodiment are the same as those shown in FIG. 18 of the third embodiment. The resistor R5 used in the second voltage generating circuit shown in FIG. 18 is divided into resistors R5a and R5b. The reference voltage Svref1 is output from the junction point between resistors R6 and R5b. The counterpart reference voltage Svref2 is output from the junction point between resistors R5a and R5b. The reference voltage Svrer1 is supplied to the operational amplifier OP1 of the first subtraction circuit, and the reference voltage Svref2 is supplied to the operational amplifier OP11 of the second subtraction circuit.

FIG. 27A through FIG. 27E show the temperature characteristics of output signals generated in the circuit shown in FIG. 26, and the operation of the circuit of FIG. 26 will be explained with reference to these graphs. In the first voltage generating circuit, the source-gate voltage of n-type transistor M2 becomes a PTAT voltage (Vptat) having a positive temperature coefficient. The outputs Vptat' and Svptat of the first voltage generating circuit are expressed as $$Vptat'=Vptat*(R2+R3)/R3 \qquad (7)$$

$$Svptat=Vptat*(R1+R2+R3)/R3. \qquad (16)$$

Figure 27A:
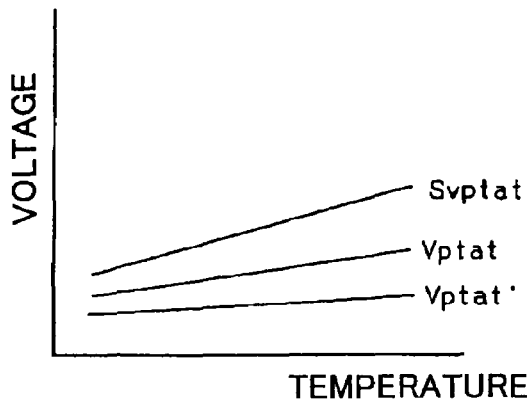
FIG. 27A through FIG. 27E are graphs showing the temperature characteristics of various signals generated in the circuit shown in FIG. 26.

FIG. 27A illustrates the temperature characteristics of these signals generated in the first voltage generating circuit. Since Vptat' and Svptat are obtained from Vptat by voltage conversion at a prescribed ratio defined by equations (7) and (16), Vptat' and Svptat also have positive temperature coefficients. However, Svptat does not have to have a large temperature coefficient, unlike Tvptat2 shown in FIG. 11.

The second voltage generating circuit operates in the same manner as that shown in FIG. 18. When Vptat' is applied to the gate of n-type transistor M6 from the junction point between the source of transistor M3 and resistor R2, a voltage Vref resulting from addition of Vpn and Vptat' is generated between the source and the gate of the n-type transistor M7. Since Vref is the sum of Vpn having a negative temperature coefficient and Vptat' having a positive temperature coefficient, the resultant Vref (the first reference voltage) does not have a temperature coefficient. Based on the first reference voltage Vref, the second reference voltage Tvref and two types of third reference voltages Sverf1 and Svref2 are generated through the voltage conversion using resistors R4, R5a, R5b, and R6. The reference voltages Vref, Tvref, Svref1, and Svref are expressed by equations (8), (9), (10)' and (10)".

$$Vref=Vptat*(R2+R3)/R3+Vpn=Vptat'+Vpn \qquad (8)$$

$$Tvref=Vref*(R5a+R5b+R6)/(R4+R5+R6) \qquad (9)$$

$$Svref1=Vref*R6/(R4+R5a+R5b+R6) \qquad (10)'$$

$$Svref2=Vref*(R5b+R6)/(R4+R5a+R5b+R6) \qquad (10)''$$

Figure 27B:
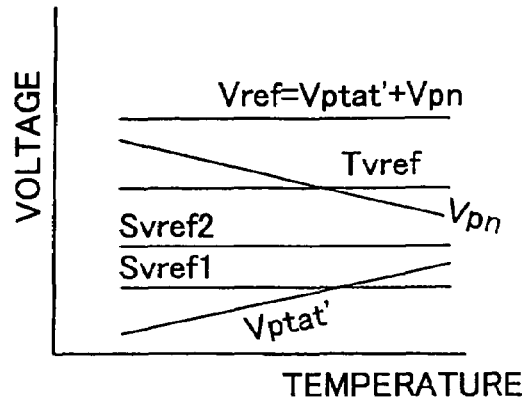

The temperature characteristics of these signals are illustrated in FIG. 27B.

The operation of the first subtraction circuit is the same as the subtraction circuit shown in FIG. 18, except for that Svref1 is used in place of Sverf. Accordingly, the output Tvptat1 of the operational amplifier OP2 becomes $$Tvptat1=(R8/R7)*(Svptat-Svtef1'). \qquad (11)'$$

Figure 27C:
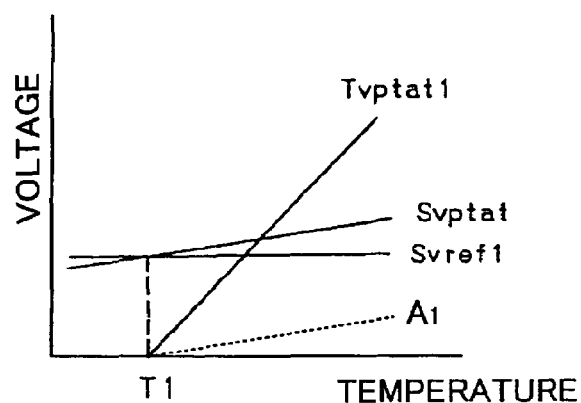

FIG. 27C illustrates the temperature characteristics of these signals processed in the first subtraction circuit. The dotted line A1 indicates the subtraction result of (Svptat−Svref1').

When the temperature is lower than T1, Svptat<Svrefl stands, and therefore, Tvptat1 becomes 0 volts. If the temperature is higher than T1, Svptat>Svref1 stands, and equation (11)' applies. From equations (11)' and (16), the ratio S1 of the temperature coefficient (or the slope) of Tvptat1 to that of Vptat is expressed as $$S1=[(R1+R2+R3)/R3]*R8/R7. \qquad (17)'$$

By simply adjusting the resistances R1, R2, R3, R7 and R8, the ratio S1 defined by equation (17)' can be easily made equal to the ratio (R1+R2+R5)/R5, which is the temperature coefficient of Tvptat obtained in the first embodiment. For instance, if the temperature coefficient of Tvptat generated in the first voltage generating circuit shown in FIG. 4 is fifty (50), the temperature coefficient ratio (R1+R2+R3)/R3] defined in the first voltage generating circuit of the fifth embodiment is set to 10, and the temperature coefficient ratio R8/R7 defined in the first subtraction circuit is set to 5. By so setting, the ratio S1 (that is, the temperature coefficient ratio of Tvptat1) becomes fifty (50), as in the circuit disclosed in the first embodiment, without causing the first voltage generating circuit itself to produce Tvptat having a large temperature coefficient.

The same applies to the second subtraction circuit. The output Tout2 of the operational amplifier OP12 is expressed as $$Tvptat2=(R18/R17)*(Svptat-Svref2') \quad (11)''$$

Figure 27D:
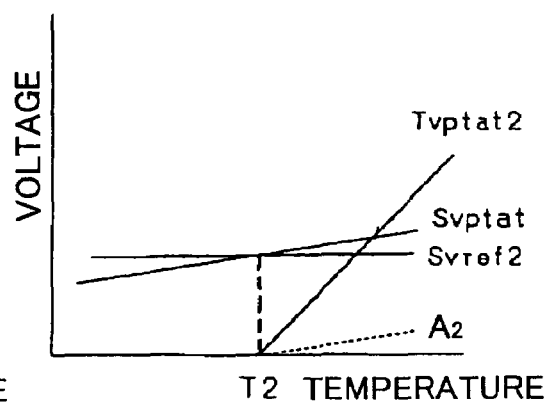

FIG. 27D illustrates the temperature characteristics of these signals processed in the second subtraction circuit, in which the dotted line A2 indicates the subtraction result of (Svptat−Svref2').

When the temperature is lower than T2, Svptat<Svref2 stands, and therefore, Tvptat2 becomes 0 volts. If the temperature is higher than T1, Svptat>Svref2 stands, and equation (11)'' applies. From equations (11)'' and (16), the ratio S2 of the temperature coefficient (or the slope) of Tvptat2 to that of Vptat is expressed as $$S2=[(R1+R2+R3)/R3]*R18/R17. \quad (17)''$$

By simply adjusting the resistances R1, R2, R3, R17 and R18, the ratio S2 defined by equation (17)'' can be easily made equal to the ratio (R1+R2+R5)/R5, which is the temperature coefficient of Tvptat obtained in the first embodiment.

For instance, if the temperature coefficient of Tvptat generated in the first voltage generating circuit shown in FIG. 4 is fifty (50), the temperature coefficient ratio (R1+R2+R3)/R3] defined in the first voltage generating circuit of the fifth embodiment is set to 10, and the temperature coefficient ratio R18/R17 defined in the second subtraction circuit is set to 5. By so setting, the ratio S2 (that is, the temperature coefficient ratio of Tvptat2) becomes fifty (50), as in the circuit disclosed in the first embodiment, without causing the first voltage generating circuit itself to produce Tvptat having a large temperature coefficient.

In the first comparison circuit, if the temperature is lower than T1, Tvref>Tvptat1 stands, and output Tout1 of the comparator (operational amplifier OP3) becomes High. If the temperature is higher than T1, Tvref<Tvptat2 stands, and therefore, the output Tout1 becomes Low.

Figure 27E:
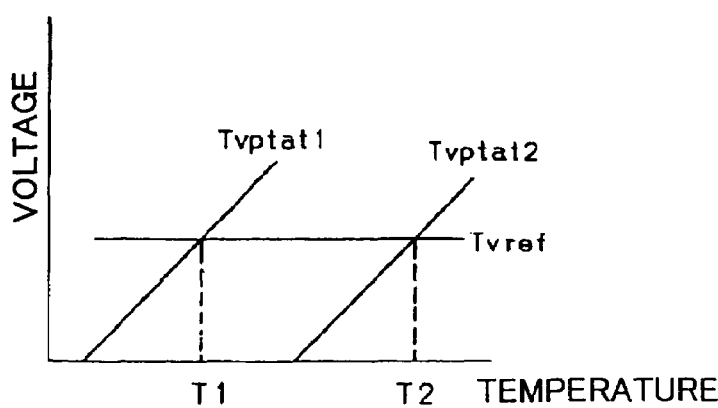

FIG. 27E illustrates the temperature characteristics of the signals processed in the first and second comparison circuits. In the second comparison circuit, if the temperature is lower than T2, Tvref>Tvptat2 stands, and output Tout2 of the comparator (operational amplifier OP13) becomes High. If the temperature is higher than T2, Tvref<Tvptat2 stands, and therefore the Tout2 becomes Low. These output signals Tout1 and Tout2 are used as control signals for a semiconductor integrated circuit, which can control the operation of the semiconductor integrated circuit at two different temperatures.

FIG. 29 illustrates the temperatures characteristics of Tptat1 and Tptat2 generated in the fifth embodiment, as compared with Tptat generated in the first embodiment. In the fifth embodiment, Svptat generated by the first voltage generating circuit is not so large, and this Svptat is further reduced to lower levels in two different temperatures ranges by subtracting Svref1 and Svref2 by the first and second subtraction circuits, respectively. The subtraction results are amplified to produce Tvpat1 and Tvpat2. These voltages Tvptat1 and Tvptat2 shift to lower levels with the same temperature coefficients as Tvptat, and consequently, the operation voltage of the entire temperature sensor can be reduced.

As in the fourth embodiment, Svref1 and Svref2 may be input alternately to a single subtraction circuit by switching the path between Svref1 and Svref2.

In this manner, the temperature sensor of the present invention can operate in at least one of the highly-sensitive operating mode and the low-voltage operating mode.

With the configuration of the first embodiment, the temperature sensor operates in either the highly-sensitive operating mode or the low-voltage operating mode. With the configurations of the second through fifth embodiments, the temperature sensor can operate at high sensitivity, and at the same time, at a low operating voltage.

With the configurations of the fourth and firth embodiments, the temperature sensor can sense two different operating temperatures precisely at low operating voltage.

This patent application is based on and claims the benefit of the earlier filing dates of Japanese patent application No. 2002-081448 filed Mar. 22, 2002 and Japanese patent application No. 2003-028514 filed Feb. 5, 2003, the entire contents of which are hereby incorporated by reference.

What is claimed is:

1. A temperature sensor comprising: a first voltage generating circuit that generates a first voltage having a positive or negative temperature coefficient; a second voltage generating circuit that generates a first reference voltage and a second reference voltage that do not have a temperature coefficient; a subtraction circuit that subtracts the first reference voltage supplied from the second voltage generating circuit from the first voltage supplied from the first voltage generating circuit, and outputs a subtraction result; and a comparison circuit that compares the subtraction result output from the subtraction circuit with the second reference voltage supplied from the second voltage generating circuit, and outputs a comparison result.

2. The temperature sensor according to claim 1, wherein the first voltage generating circuit includes two or more transistors that are of a same conductivity type and with different impurity concentrations of gates.

3. The temperature sensor according to claim 1, wherein the first voltage generating circuit includes a first transistor having a highly-doped n-type gate, a second transistor having a lightly-doped n-type gate, and a source follower comprised of a third transistor and at least one resistor, and wherein the source follower gives a gate potential to the second transistor.

4. The temperature sensor according to claim 1, wherein the second voltage generating circuit includes two or more transistors having different gate polarities.

5. The temperature sensor according to claim 1, wherein the subtraction circuit includes: a differential amplifier comprised of a first operational amplifier and first through fourth resistors; and a voltage follower comprised of a second operational amplifier.

6. The temperature sensor according to claim 1, wherein the second voltage generating circuit generates a second voltage having a positive or negative temperature coefficient, and a third voltage having an opposite sign of temperature coefficient compared to the second voltage, and wherein the first and second reference voltages are generated based on the sum of the second and third voltage.

7. The temperature sensor according to claim 1, wherein the first voltage generating circuit generates and outputs a second voltage having the same sign of temperature coefficient as the first voltage to the second voltage generating circuit, and the second voltage generating circuit generates a third voltage having an opposite sign of temperature coefficient compared to the first voltage and having the same absolute value as the second voltage, and adds the third voltage to the second voltage to produce the first and second reference voltages.

8. The temperature sensor according to any one of claims 1 through 7, further comprising a second subtraction circuit and a second comparison circuit, the second subtraction circuit receiving the first voltage from the first voltage generating circuit, the second comparison circuit receiving the second reference voltage and an output from the second subtraction circuit, wherein the second voltage generating circuit outputs two values of the first reference voltage for the two subtraction circuits, and the temperatures sensor outputs two comparison results at different temperatures.

9. The temperature sensor according to claim 1, wherein the second voltage generating circuit includes a first transistor having a highly-doped n-type gate, a second transistor having a highly-doped p-type gate, and a source follower comprised of a third transistor and at least one resistor, and wherein the source follower gives a gate potential to the second transistor.

10. The temperature sensor according to claim 9, wherein the subtraction circuit includes: a differential amplifier comprised of a first operational amplifier and first through fourth resistors; and a voltage follower comprised of a second operational amplifier, and wherein the first reference voltage is output from the source follower of the second voltage generating circuit to the first operational amplifier of the subtraction circuit.

11. The temperature sensor according to claim 9, wherein the subtraction circuit includes a differential amplifier that is comprised of a first operational amplifier and first through fourth resistors, and wherein the resistance values of the first through fourth resistors are set greater than that of said at least one resistor of the source follower of the second voltage generating circuit.

12. The temperature sensor according to claim 11, wherein the first reference voltage is output from the source follower of the second voltage generating circuit to the first operational amplifier of the subtraction circuit.

* * * * *